(12) United States Patent
Xu et al.

(10) Patent No.: US 12,499,375 B2
(45) Date of Patent: Dec. 16, 2025

(54) GENERATING RECOMMENDATIONS USING ADVERSARIAL COUNTERFACTUAL LEARNING AND EVALUATION

(71) Applicant: Walmart Apollo, LLC, Bentonville, AR (US)

(72) Inventors: Da Xu, San Jose, CA (US); Chuanwei Ruan, Santa Clara, CA (US); Sushant Kumar, Sunnyvale, CA (US); Evren Korpeoglu, San Jose, CA (US); Kannan Achan, Saratoga, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 1067 days.

(21) Appl. No.: 17/163,398

(22) Filed: Jan. 30, 2021

(65) Prior Publication Data

US 2022/0253721 A1     Aug. 11, 2022

(51) Int. Cl.
*G06N 5/04*        (2023.01)
*G06N 20/00*      (2019.01)

(52) U.S. Cl.
CPC .............. *G06N 5/04* (2013.01); *G06N 20/00* (2019.01)

(58) Field of Classification Search
CPC .......... G06N 5/04; G06N 20/00; G06N 3/045; G06N 7/01; G06N 3/047; G06N 3/088; G06Q 30/0282; G06Q 30/0241; G06Q 30/0631
See application file for complete search history.

(56) References Cited

U.S. PATENT DOCUMENTS

| 8,606,608 B2 | 12/2013 | Bottou et al. |
| 2019/0026274 A1 | 1/2019 | Deng et al. |
| 2020/0327600 A1 | 10/2020 | Mlmazcoban et al. |
| 2022/0230089 A1* | 7/2022 | Peraud .................. G06N 3/082 |

FOREIGN PATENT DOCUMENTS

KR         20200107389 A   *  9/2020  ............... G06N 3/02

OTHER PUBLICATIONS

Zhongchuan Sun et al., "APL: Adversarial Pairwise Learning for Recommender Systems", Expert Systems with Applications vol. 118, 2019, pp. 573-584, https://doi.org/10.1016/j.eswa.2018.10.024. (Year: 2019).*

(Continued)

*Primary Examiner* — Markus A. Vasquez
(74) *Attorney, Agent, or Firm* — FOLEY & LARDNER LLP

(57) ABSTRACT

A system including one or more processors and one or more non-transitory computer-readable media storing computing instructions that, when executed on the one or more processors, perform certain acts. The acts can include obtaining training data. The acts also can include training candidate recommendation models and an adversarial exposure model using the training data. The acts additionally can include generating recommendations based on a selected recommendation model of the candidate recommendation models. Other embodiments are described.

20 Claims, 14 Drawing Sheets

(56) References Cited

OTHER PUBLICATIONS

Mi Luo et al., Meta-Selector: Meta-Learning for Recommendation with User-Level Adaptive Model Selection, Proceedings of The Web Conference 2020 (WWW '20). Association for Computing Machinery, pp. 2507-2513, https://doi.org/10.1145/3366423.3379999 (Year: 2020).*

Kim et al., "Rating Augmentation and Item Recommendation Method and System Based on Generative Adversarial Networks", English machine translation of KR20200107389A, Clarivate Analytics, 2023, EP1-13 (Year: 2023).*

Heusel, Martin, et al. "Gans trained by a two time-scale update rule converge to a local nash equilibrium." Advances in neural information processing systems 30 (2017). (Year: 2017).*

Bai, X., Guan, J., and Wang, H., "Model-Based Reinforcement Learning With Adversarial Training for Online Recommendation," 33rd Conference on Neural Information Processing Systems (NeurIPS 2019), Vancouver, Canada, 12 pgs. 2019.

Ding, J., et al., "Reinforced Negative Sampling for Recommendation With Exposure Data," Proceedings of the Twenty-Eighth International Joint Conference on Artificial Intelligence (IJCAI-19), pp. 2230-2236 2019.

Xu, D., et al., "Adversarial Counterfactual Learning and Evaluation for Recommender System," 34th Conference on Neural Information Processing Systems (NeurIPS 2020), Vancouver, Canada, 25 pgs. 2020.

Agarwal, A., Zaitsev, I., and Joachims, T., "Counterfactual Learning-to-Rank for Additive Metrics and Deep Models," Preprint, 2018, 10 pgs. 2018.

Ai, Q., et al. "Unbiased Learning to Rank With Unbiased Propensity Estimation," arXiv:1804.05938v2 [cs.IR], Apr. 23, 2018, 10 pgs. Apr. 23, 2018.

Austin, P., "An Introduction to Propensity Score Methods for Reducing the Effects of Confounding in Observational Studies," Multivariate Behavioral Research, 46:3, 399-424, DOI: 10.1080/00273171.2011.568786, 27 pgs. 2011.

Austin, P. and Stuart, E., "Moving Towards Best Practice When Using Inverse Probability of Treatment Weighting (IPTW) Using the Propensity Score to Estimate Casual Treatment Effects in Observational Studies," Statistics in Medicine, by John Wiley & Sons Ltd., 2015, 34 pp. 3661-3679 Aug. 3, 2015.

Cheng, H., et al., "Wide & Deep Learning for Recommender Systems," DLRS '16, Sep. 15, 2016, Boston, MA, 4 pgs. Sep. 15, 2016.

Covington, P., Adams, J., and Sargin E., "Deep Neural Networks for YouTube Recommendatoins," RecSys '16, Sep. 15-19, 2016, Boston, MA, DOI: http://dx.doi.org/10.1145/2959100.2959190, pp. 191-198 Sep. 15, 2016.

Dacrema, M., Cremonesi, P., and Jannach, D., "Are We Really Making Much Progress? A Worrying Analysis of Recent Neural Recommendation Approaches," arXiv:1907.06902v3 [CS.IR] Aug. 16, 2019, 10 pgs. Aug. 16, 2019.

Franks, A., D'Amour, A., and Feller, A., "Flexible Sensitivity Analysis for Observational Studies Without Observable Implications," arXiv:1809.00399v3 [stat.ME] Jan. 14, 2019, 38 pgs. Jan. 14, 2019.

Franks, A., Airoldi, E., and Rubin, D., "Non-Standard Conditionally Specified Models for Non-Ignorable Missing Data," arXiv:1603.06045v1 [stat.ME] Mar. 19, 2016, 41 pgs. Mar. 19, 2016.

Gao, R., Chen, X., and Kleywegt, A., "Wasserstein Distributional Robustness and Regularization," arXiv:1712.06050v3, Oct. 3, 2020, 44 pgs. Dec. 17, 2017.

Goodfellow, I., "NIPS 2016 Tutorial: Generative Adversarial Networks," arXiv:1701.00160v4 [cs.LG] Apr. 3, 2017, 57 pgs. Apr. 3, 2017.

He, X., et al., "Neural Collaborative Filtering," arXiv:1708.05031v2 {cs.IR] Aug. 26, 2017, 10 pgs. Aug. 26, 2017.

He, X., He, Z., Du, X., and Chua, T., "Adversarial Personalized Ranking for Recommendation," arXiv:1808.03908v1 [cs.IR] Aug. 12, 2018, 10 pgs. Aug. 12, 2018.

Hernandez-Lobato, J.M., Houlsby, N., and Ghahramani, Z., "Probabilistic Matrix Factorization With Non-Random Missing Data," Proceedings of the 31st International Conference on Machine Learning, Beijing, China, 2014, JMLR: W&CP vol. 32, 9 pgs. 2014.

Heusel, M., et al., "GANs Trained by a Two Time-Scale Update Rule Converge to a Local Nash Equilibrium," 31st Conference on Neural Information Processing Systems (NIPS 2017), Long Beach, CA, USA, 12 pgs. 2017.

Hirano, K., and Imbens, G.W., "Estimation of Casual Effects Using Propensity Score Weighting: An Application to Data on Right Heart Catheterization," Health Services & Outcomes Research Methodology 2:259-278, 2001, 2002 Kluwer Academic Publishers, Netherlands; 20 pgs. Feb. 2, 2001.

Jin, C., Netrapalli, P., and Jordan, M.I., "What is Local Optimality in Nonconvex-Nonconcave Minimax Optimization?," Proceedings of the 37th Internatoinal Conference on Machine Learning, Online, PMLR 119, 2020, 10 pgs. 2020.

Joachims, T., Swaminathan, A., and Schnabel, T., "Unbiased Learning-to-Rank With Biased Feedback," WSDM 2017, Feb. 6-10, 2017, Cambridge, United Kingdom, DOI: http://dx.doi.org/10.1145/3018661.3018669, pp. 781-789 Feb. 6, 2017.

Kallus, N., "DeepMatch: Balancing Deep Covariate Representations for Casual Inference Using Adversarial Training," Proceedings of the 37th International Conference on Machine Learning, Vienna, Austria, PMLR 119, 2020, 11 pgs. 2020.

Kang, W. and McAuley, J., "Self-Attentive Sequential Recommendatoin," arXiv:1808.09781v1 [cs.IR] Aug. 20, 2018, 10 pgs. Aug. 20, 2018.

Li, L., et al., "A Contextual-Bandit Approach to Personalized News Article Recommendation, " arXiv:1003.0146v2 [cs.LG] Mar. 1, 2012, originally in WWW 2010, Apr. 26-30, 2010, Raleigh, NC, USA, 10 pgs. Apr. 26, 2020.

Liang, D., et al., "Casual Inference for Recommendatoin." 2016, 10 pgs. 2016.

Liang, D., et al., "Modeling User Exposure in Recommendation," arXiv:1510.07025v2 [stat.ML] Feb. 4, 2016, 11 pgs. Feb. 4, 2016.

Panaretos V.M. and Zemel, Y., "Statistical Aspects of Wasserstein Distances," arXiv:1806.05500v3 [stat.ME], Apr. 9, 2019, 37 pgs. Apr. 9, 2019.

Pearl, J., "Causal Inference in Statistics: An Overview," Statistical Surveys, vol. 3 (2009) pp. 96-146, DOI: 10.1214/09-SS057, 51 pgs. Sep. 2009.

Rahimian, H. and Mehrotra, S., "Distributionally Robust Optimization: A Review," arXiv:1908.05659v1 [math.OC] Aug. 13, 2019, 90 pgs. Aug. 13, 2019.

Ratliff, L.J., Burden, S.A., and Sastry, S.S., "Characterization and Computation of Local Nash Equilibria in Continuous Games," Trust Conference, Oct. 3, 2013, 28 pgs. Oct. 3, 2013.

Rendle, S., et al., "Neural Collaborative Filtering vs. Matrix Factorization Revisited," RecSys '20, Sep. 22-26, 2020, Virtual Event, Brazil, https://doi.org/10.1145/3383313.3412488, pp. 240-248 Sep. 22, 2020.

Rosenbaum, P.R. and Rubin, D.B., "The Central Role of the Propensity Score in Observational Studies for Casual Effects," Biometrika (1983), 70, 1, pp. 41-55, downloaded from https://academic.oup.com/biomet/article/70/1/41/240879 by guest on Dec. 7, 2021 1983.

Rosenbaum, P.R., "Design of Observational Studies," Springer Series in Statistics, published by Springer Science +Business Media, LLC 2010, DOI 10.1007/978-1-4419-1213-8, 382 pgs. 2010.

Saito, Y., et al., Unbiased Recommender Learning From Missing-Not-At-Random Implicit Feedback, arXiv:1909.03601v3 [stat.ML] Feb. 9, 2020, 9 pgs. Feb. 9, 2020.

Schafer, J.B., et al., "Collaborative Filtering Recommender Systems," P. Brusilovsky, A. Kobsa, and W. Nejdl (Eds): The Adaptive Web, LNCS 4321, pp. 291-324, 2007, published by Springer-Verlag Berlin Heidelberg Jan. 2007.

(56) References Cited

OTHER PUBLICATIONS

Schnabel, T., et al., "Recommendations as Treatments: Debiasing Learning and Evaluation," Proceedings of the 33rd Int'l Conference on Machine Learning, New York, NY USA, 2016, JMLR: W7CP vol. 48, 10 pgs. 2016.

Shafieezadeh-Abadeh, S., et al., "Regularization via Mass Transportation," Journal of Machine Learning Research 20 (2019) pp. 1-68 Oct. 17, 2019.

Tramer, F., et al., "Ensemble Adversarial Training: Attacks and Defenses," arXiv:1705.07204v5 [stat.ML] Apr. 26, 2020, published as a conference paper at ICLR in 2018, 22 pgs. 2018.

Villani, C., "Optimal Transport, Old and New," published by Springer, 2008—998 pgs. Jun. 13, 2008.

Wang, J., et al., "IRGAN: A Minimax Game for Unifying Generative and Discriminative Information Retrieval Models," arXiv:1705.10513v2 [cs.UR] Feb. 20, 2018, 12 pgs. Feb. 22, 2018.

Wang, M., et al., "Modeling Dynamic Missingness of Implicit Feedback for Recommendation," Adv Neural Inf Process Syst. Dec. 2018; vol. 31; pp. 6669-6678 Dec. 2018.

Xie, C., et al., "Feature Denoising for Improving Adversarial Robustness," arXiv:1812.03411v2 [cs.CV] Mar. 25, 2019, 9 pgs. Mar. 25, 2019.

Xu, D., et al., "Self-Attention With Functional Time Representation Learning," 33rd Conference on Neural Information Processing Systems (NeurIPS 2019), Vancouver, Canada, 11 pgs. 2019.

Yang, L., et al., "Unbiased Offline Recommender Evaluation for Missing-Not-At Random Implicity Feedback," RecSys 18, Oct. 2-7, 2018, Vancouver, BC, Canada, https://doi.org/10.1145/3240323.3240355, pp. 279-287 Oct. 2, 2018.

Ying, R., et al., "Graph Convolutional Neural Networks for Web-Scale Recommender Systems," arXiv:1806.01973v1 [cs.IR] Jun. 6, 2018, 10 pgs. Jun. 6, 2018.

Yoon, J., Jordon, J., and van der Schaar, M., "GANITE: Estimation of Individualized Treatment Effects Using Generative Adversarial Nets," Published as a conference paper at ICLR 2018, 22 pgs. 2018.

Zhang, S., et al., "Deep Learning Based Recommender System: A Survey and New Perspectives," ACM Comput. Surv. 1, 1, Article 1 (Jul. 2018), 35 pgs. arXiv:1707.07435v7 [cs.IR] Jul. 10, 2019 Jul. 10, 2019.

Zheng, G., et al., "DRN: A Deep Reinforcement Learning Framework for News Recommendation," WWW 2018, Apr. 23-27, 2018, Lyon, France, https://doi.org/10.1145/3178876.3185994, pp. 167-176 Apr. 23, 2018.

Zhou, G., et al., "Deep Interest Network for Click-Through Rate Prediction," arXiv:1706.06978v4 [stat.ML] Sep. 13, 2018, 9 pgs. Sep. 13, 2018.

Morgan, S.L. and Winship, C., "Counterfactuals and Causal Inference—Methods and Principles for Social Research," Cambridge University Press, 2007, 335 pgs. 2007.

Prasad, H.L., Prashanth, L.A., and Bhatnagar, S., "Two-Timescale Algorithms for Learning Nash Equilibria in General-Sum Stocastic Games," Proceedings of the 14th International Conference on Autonomous Agents and Multiagent Systems (AAMAS 2015), Bordini, Elkind, Weiss, Yolum (eds.), May 4-8, 2015, Istanbul, Turkey, pp. 1371-1379 May 4, 2015.

Terkelsen, F., "Some Minimax Theorems," Math. Scand. 31 (1972), pp. 405-413 1972.

Talagrand, M., "Upper and Lower Bounds for Stochastic Processes," Springer-Verlag, 163 pgs. Jun. 8, 2021.

\* cited by examiner

Table 910

| config | MLP / Pop | MLP / MLP | MLP / Oracle | GMF / Pop | GMF / GMF | GMF / Oracle | ACL-MLP / MLP | ACL-GMF / GMF |
|---|---|---|---|---|---|---|---|---|
| *MovieLens-1M* | | | | | | | | |
| Hit@10 | 39.60 (.12) | 39.24 (.3) | 39.68 (.3) | 39.00 (.2) | 39.47 (.1) | 39.10 (.2) | 40.32 (.1) | 39.08 (.2) |
| NDCG@10 | 20.26 (.1) | 20.10 (.2) | 20.33 (.2) | 19.33 (.3) | 19.58 (.2) | 19.30 (.1) | 20.81 (.2) | 19.61 (.1) |
| *Goodreads* | | | | | | | | |
| Hit@10 | 31.90 (.3) | 30.61 (.2) | 33.82 (.1) | 30.01 (.3) | 31.36 (.2) | 33.50 (.1) | 33.45 (.2) | 32.51 (.2) |
| NDCG@10 | 16.65 (.2) | 15.72 (.2) | 17.81 (.1) | 15.24 (.2) | 16.40 (.2) | 17.28 (.2) | 17.50 (.1) | 16.85 (.1) |

Table 920

| Data | *MovieLens-1M* | | | | *Goodreads* | | | |
|---|---|---|---|---|---|---|---|---|
| Model | Pop | CF | MLP | GMF | Pop | CF | MLP | GMF |
| Hit@10 | 33.76 (.1) | 38.27 (.2) | 39.43 (.2) | 39.00 (.2) | 26.62 (.3) | 30.90 (.2) | 31.78 (.2) | 29.59 (.3) |
| NDCG@10 | 17.75 (.1) | 18.59 (.2) | 20.09 (.2) | 19.28 (.3) | 14.29 (.2) | 16.43 (.1) | 16.58 (.2) | 14.94 (.2) |

| config | Pop | CF | MLP | NCF | GMF | Attn | PS | ACL | ACL |
|---|---|---|---|---|---|---|---|---|---|
| | | | | | | | Attn / Pop | GMF / GMF | Attn / Attn |
| MovieLens-1M | | | | | | | | | |
| Hit@10 | 42.18 (2) | 60.97 (1) | 61.01 (2) | 63.37 (3) | 63.97 (1) | 82.66 (2) | 81.97 (1) | 64.32 (2) | 83.64 (1) |
| NDCG@10 | 21.99 (1) | 32.59 (.1) | 32.09 (.3) | 33.49 (.1) | 33.82 (2) | 55.27 (1) | 54.51 (.1) | 33.70 (.1) | 55.71 (2) |
| | | | | | | | GMF / Pop | GMF / GMF | Attn / Attn |
| LastFM | | | | | | | | | |
| Hit@10 | 25.26 (2) | 52.97 (3) | 81.86 (3) | 81.87 (3) | 83.12 (3) | 71.89 (3) | 82.64 (2) | 83.64 (2) | 72.02 (2) |
| NDCG@10 | 15.35 (1) | 31.54 (2) | 58.38 (2) | 57.33 (4) | 58.96 (2) | 59.75 (2) | 58.84 (2) | 59.11 (1) | 59.45 (1) |
| | | | | | | | Attn / Pop | GMF / GMF | Attn / Attn |
| Goodreads | | | | | | | | | |
| Hit@10 | 43.36 (1) | 60.32 (2) | 62.17 (2) | 63.11 (3) | 63.78 (1) | 72.63 (2) | 73.39 (1) | 64.17 (2) | 73.82 (3) |
| NDCG@10 | 22.73 (2) | 37.73 (1) | 37.65 (1) | 38.78 (3) | 38.69 (1) | 48.98 (1) | 49.92 (3) | 39.53 (1) | 49.99 (1) |

FIG. 10

| MSE on metric | Standard | Popularity debiased | Propensity model debiased | Robust |
|---|---|---|---|---|
| Hit@5 | .18(.10) | .14(.08) | .14(.06) | .12(.04) |
| NDCG@5 | .10(.06) | .09(.05) | .08(.05) | .07(.05) |

| config | MLP Pop | MLP MLP | GMF Pop | GMF GMF | NCF Pop | NCF NCF | Attention Pop | Attention Attention |
|---|---|---|---|---|---|---|---|---|
| *MovieLens-1M* | | | | | | | | |
| Hit@10 | 61.93 (.2) | 60.85 (.1) | 64.21 (.3) | 62.19 (.1) | 63.78 (.4) | 61.28 (.2) | 81.97 (.1) | 81.05 (.2) |
| NDCG@10 | 33.37 (.1) | 31.90 (.2) | 34.96 (.1) | 32.53 (.2) | 34.05 (.1) | 30.98 (.3) | 54.51 (.1) | 52.33 (.1) |
| *Last-FM* | | | | | | | | |
| Hit@10 | 82.06 (.3) | 81.32 (.1) | 82.64 (.3) | 81.87 (.1) | 82.29 (.3) | 80.35 (.2) | 72.71 (.2) | 70.98 (.1) |
| NDCG@10 | 57.55 (.2) | 58.16 (.1) | 58.83 (.2) | 57.92 (.3) | 58.40 (.1) | 57.02 (.3) | 60.13 (.2) | 59.33 (.2) |
| *Goodreads* | | | | | | | | |
| Hit@10 | 62.59 (.1) | 60.03 (.3) | 64.92 (.2) | 64.43 (.2) | 63.75 (.2) | 61.44 (.3) | 73.39 (.3) | 71.37 (.2) |
| NDCG@10 | 38.01 (.2) | 37.32 (.1) | 39.21 (.1) | 38.45 (.1) | 38.85 (.2) | 38.03 (.1) | 49.99 (.1) | 49.18 (.2) |

1220

| ACL variant Metric | ACL-MLP Hit@10 | ACL-MLP NDCG@10 | ACL-GMF Hit@10 | ACL-GMF NDCG@10 | ACL-NCF Hit@10 | ACL-NCF NDCG@10 | ACL-Attention Hit@10 | ACL-Attention NDCG@10 |
|---|---|---|---|---|---|---|---|---|
| *MovieLens-1M* | 62.04 (.2) | 33.59 (.2) | 64.32 (.2) | 33.70 (.1) | 63.97 (.2) | 34.81 (.1) | 83.64 (.1) | 55.71 (.2) |
| *Last-FM* | 82.88 (.2) | 57.43 (.2) | 83.64 (.2) | 59.11 (.1) | 83.09 (.2) | 58.93 (.2) | 72.02 (.2) | 59.45 (.1) |
| *Goodreads* | 62.90 (.2) | 38.57 (.1) | 64.57 (.2) | 39.54 (.1) | 63.95 (.2) | 38.72 (.1) | 73.82 (.3) | 49.99 (.1) |

FIG. 12

GENERATING RECOMMENDATIONS USING ADVERSARIAL COUNTERFACTUAL LEARNING AND EVALUATION

TECHNICAL FIELD

This disclosure relates generally to generating recommendations using adversarial counterfactual learning and evaluation.

BACKGROUND

Item recommendations can assist a user when selecting items online. For example, when a user views an anchor item, one or more recommended items can be displayed, which can be items that are similar and/or complementary to the anchor item. Many recommendations models are used conventionally. These recommendation models typically do not account for the underlying exposure mechanism, which can result in suboptimal recommendations.

BRIEF DESCRIPTION OF THE DRAWINGS

To facilitate further description of the embodiments, the following drawings are provided in which:

FIG. 9 includes tables showing unbiased evaluations (using the true exposure) for the baselines and the ACL approach on the semi-synthetic data;

FIG. 10 includes a table showing that the models trained by the ACL approach achieve the best outcome;

FIG. 11 includes a table showing mean-squared error (MSE) to online evaluation results from eight online experiments;

FIG. 12 includes tables showing standard evaluations on the real-world data using the propensity-score models and considering all ACL base model;

Figure 1:
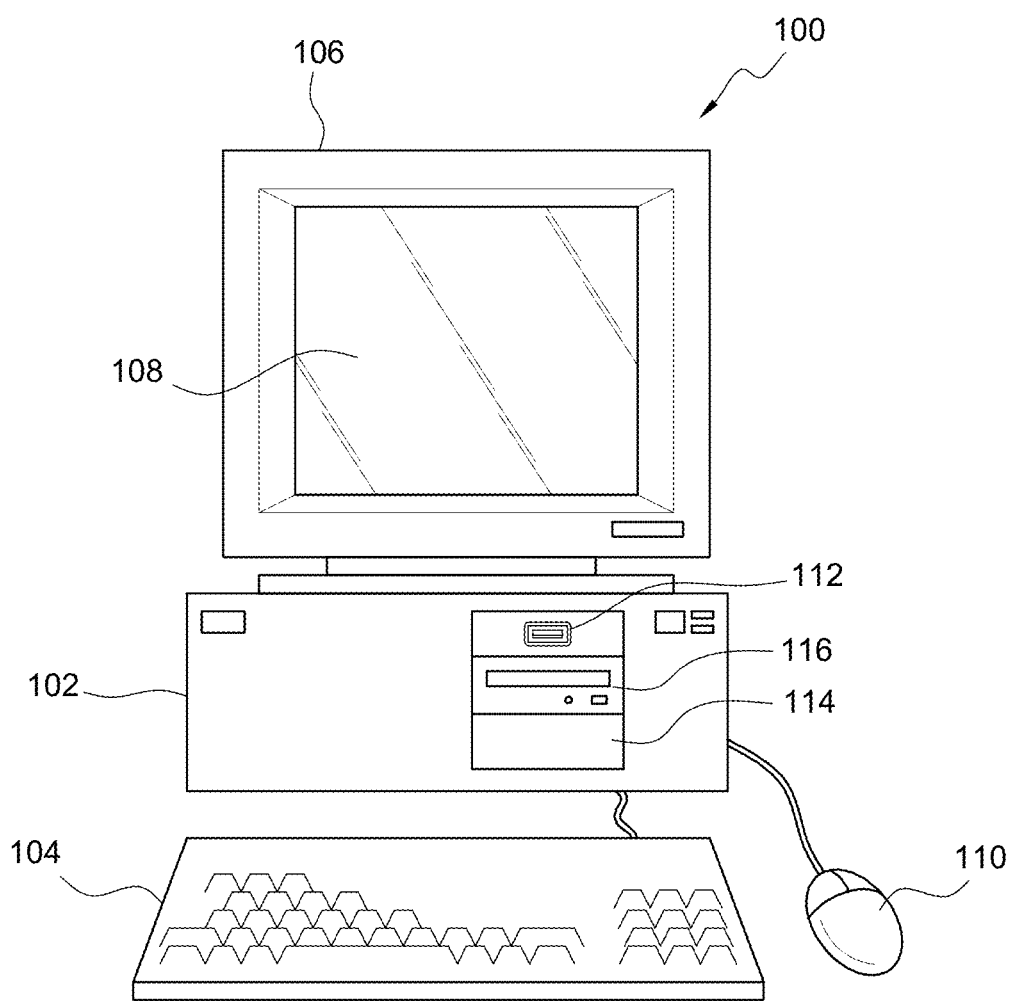
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real-time" encompasses operations that occur in "near" real-time or somewhat delayed from a triggering event. In a number of embodiments, "real-time" can mean real-time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately 0.1 second, 0.5 second, one second, two seconds, five seconds, or ten seconds.

DESCRIPTION OF EXAMPLES OF EMBODIMENTS

Figure 2:
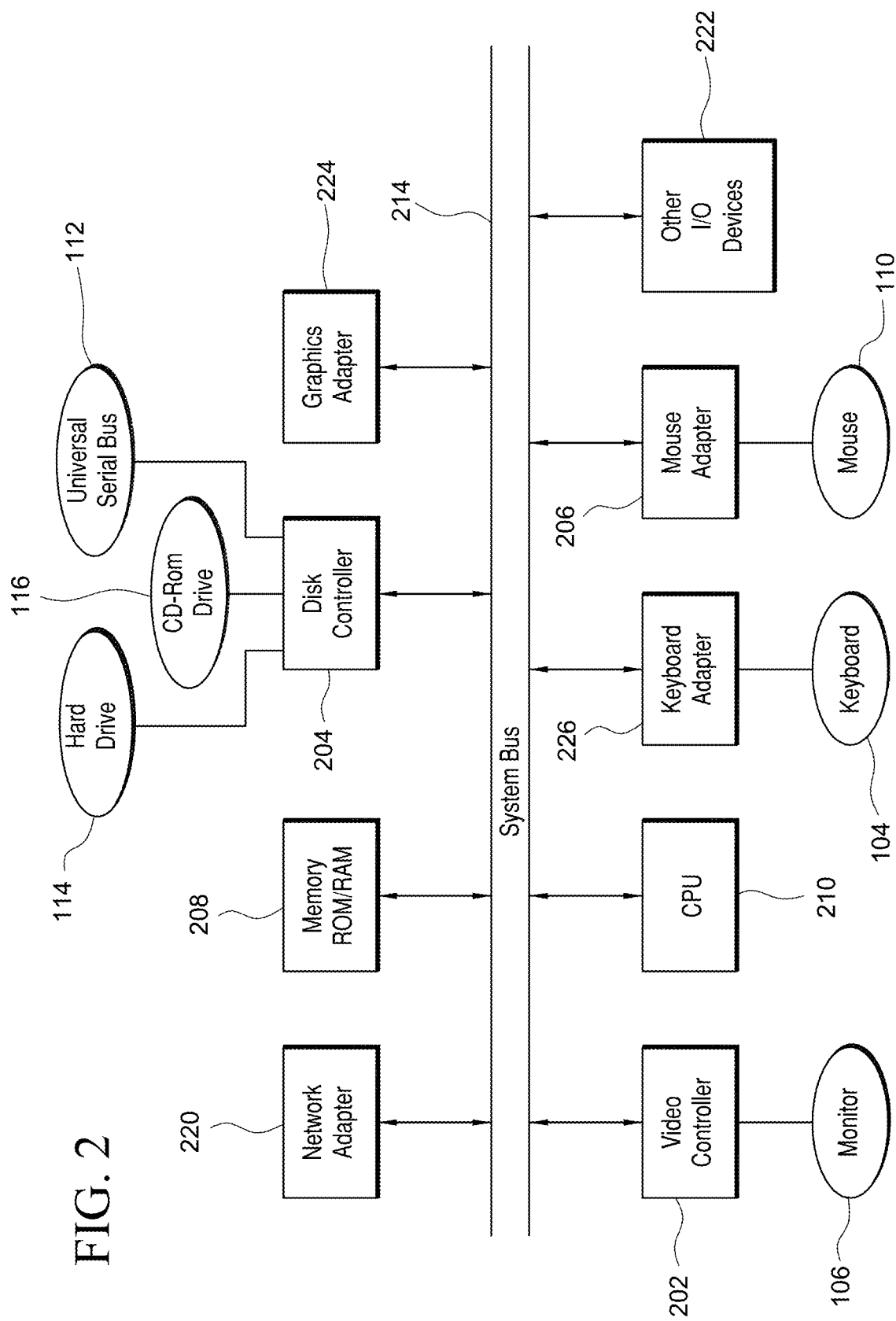
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can include one or more of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, or (v) the Windows Mobile™ operating system by Microsoft Corp. of Redmond, Washington, United States of America.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 1) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such as a smartphone. In certain additional embodiments, computer system 100 may comprise an embedded system.

Figure 3:
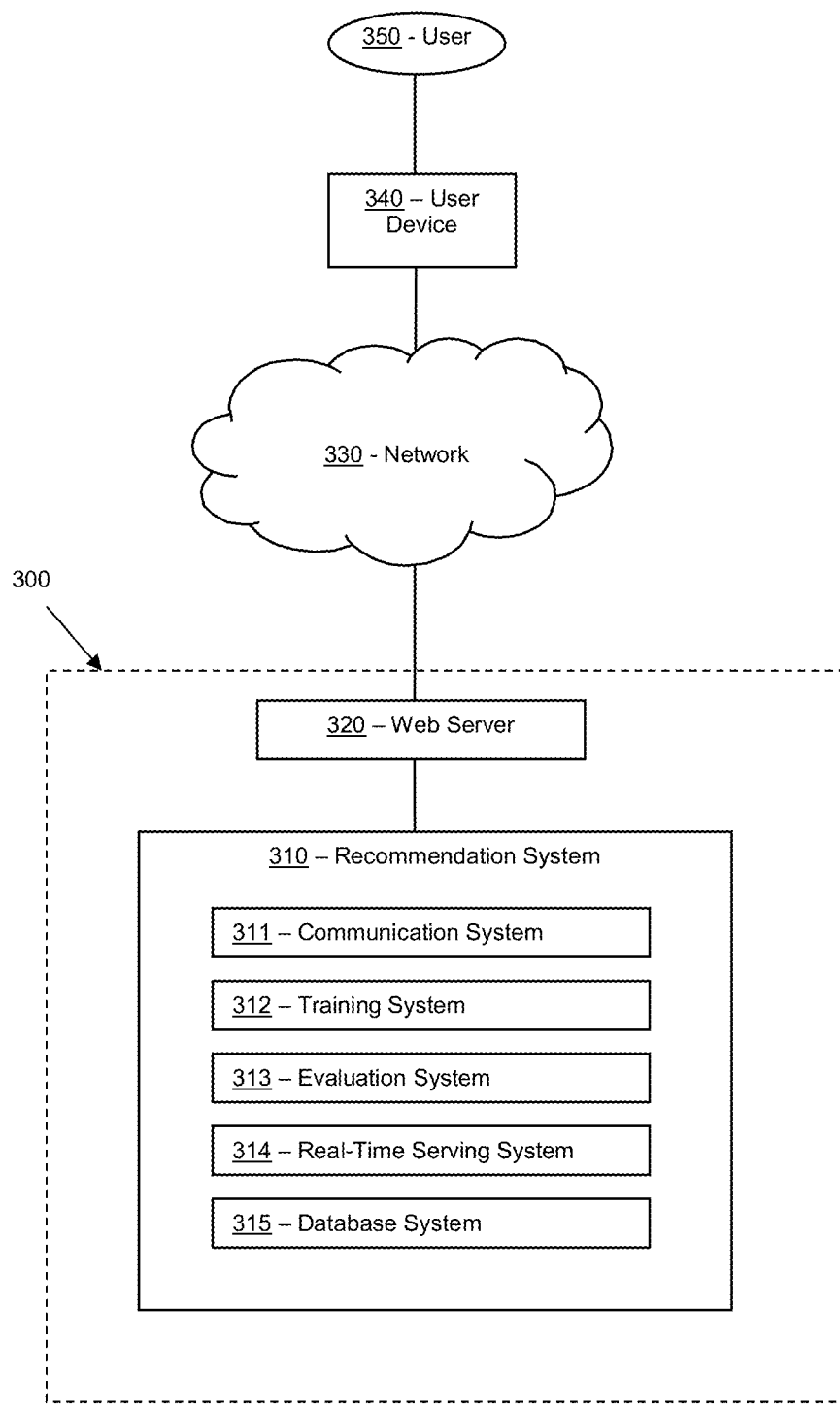
FIG. 3 illustrates a block diagram of a system that can be employed for generating recommendations using adversarial counterfactual learning and evaluation, according to an embodiment.

Turning ahead in the drawings, FIG. 3 illustrates a block diagram of a system 300 that can be employed for generating recommendations using adversarial counterfactual learning and evaluation, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a recommendation system 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Recommendation system 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host recommendation system 310 and/or web server 320. Additional details regarding recommendation system 310 and/or web server 320 are described herein.

In some embodiments, web server 320 can be in data communication through a network 330 with one or more user devices, such as a user device 340. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to browse and/or search for items (e.g., products, grocery items), to add items to an electronic cart, and/or to purchase items, in addition to other suitable activities. In a number of embodiments, web server 320 can interface with recommendation system 310 when a user (e.g., 350) is viewing items in order to recommend items to the user.

In some embodiments, an internal network that is not open to the public can be used for communications between recommendation system 310 and web server 320 within system 300. Accordingly, in some embodiments, recommendation system 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, recommendation system 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to recommendation system 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of recommendation system 310 and/or web server 320. In a similar manner, the processors and/or the non-transitory computer-readable media can be local and/or remote to each other.

Meanwhile, in many embodiments, recommendation system 310 and/or web server 320 also can be configured to communicate with one or more databases, such as a database system 315. The one or more databases can include a product database that contains information about products, items, or SKUs (stock keeping units), for example, among other information, as described below in further detail. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, recommendation system 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, recommendation system 310 can include a communication system 311, a training system 312, an evaluation system 313, a rea-time serving system 314, and/or database system 315. In many embodiments, the systems of recommendation system 310 can be modules of computing instructions (e.g., software modules) stored at non-transitory computer readable media that operate on one or more processors. In other embodiments, the systems of recommendation system 310 can be implemented in hardware. Recommendation system 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host recommendation system 310 and/or web server 320. Additional details regarding recommendation system 310 the components thereof are described herein.

In many embodiments, system 300 can provide item recommendations to a user (e.g., as customer) based on an anchor item that the user has selected to view, is about to view, and/or is viewing. For example, when a user selects an item (e.g., a product) to view from a list of products, an item page for the item can display information about the item. This item can be considered the anchor item. The item page also can display information about other items related to the anchor item. These other items can be the item recommendations, and they can be items that are similar and/or complementary to the anchor item. If a user is interested in an anchor item, but it is not exactly what the user wants, a similar item might be what the user wants (e.g., butter and margarine, or butter and shortening). By contrast, complementary items are items that are different (often in different categories), but are often purchased together (e.g., hot dogs and hot dog buns, or hot dogs and ketchup).

Conventionally, item recommendations are shown to users, but a user is exposed to a very small subset of the total number of items available. Moreover, a user's interest can be affected by the items that the user has been shown. For example, if a user has been shown three items and is interested in a first item of the three items, the user's interest in the first item can be based on having seen those three items. For a fourth item that has not been shown to the user, it can be difficult to know if the user will be interest in the fourth item. Moreover, the extent of a user's exposure to items is often unknown, as a user can be exposed to items outside of web server 320, such as through television advertisements, seeing items at a physical store, seeing items on different websites, talking to other people about items. As such, it can be difficult to know if a user is interest in an item or if the user was exposed to the item elsewhere and is looking for more information about the item. A click model is sometimes often used to address this issue, but recommendations from such models often assume the user's interest, which can be an incorrect assumption.

The feedback data of recommender systems are often subject to what was exposed to the users; however, most learning and evaluation methods do not account for the underlying exposure mechanism. Applying supervised learning to detect user preferences can end up with inconsistent results in the absence of exposure information. The counterfactual propensity-weighting approach from causal inference can account for the exposure mechanism; nevertheless, the partial-observation nature of the feedback data can cause identifiability issues. In a number of embodiments, system 300 can use a minimax empirical risk formulation. The relaxation of the dual problem can be converted to an adversarial game between two recommendation models, in which the opponent of the candidate model characterizes the underlying exposure mechanism. Learning bounds can be provided, and simulation studies illustrate and justify the techniques described herein over a broad range of recommendation settings, which can shed insights on the various benefits of the techniques described herein.

In the offline learning and evaluation of recommender systems, the dependency of feedback data on the underlying exposure mechanism is often overlooked. When the users express their preferences on the products explicitly (such as providing ratings) or implicitly (such as clicking), the feedback are conditioned on the products to which they are exposed. In most cases, the previous exposures are decided by some underlying mechanism such as the history recommender system. The dependency causes two dilemmas for machine learning in recommender systems, and solutions have yet to be found satisfactorily. Firstly, the majority of supervised learning models handle merely the dependency between label (user feedback) and features, yet in the actual feedback data, the exposure mechanism can alter the dependency pathways, as shown in FIG. 4 and described below.

From a theoretical perspective, directly applying supervised learning on feedback data can result in inconsistent detection of the user preferences. Secondly, an unbiased model evaluation can have the product exposure determined by the candidate recommendation model, which is almost never satisfied when merely using the feedback data. The second dilemma also reveals a gap between evaluating models by online experiments and using history data, because the offline evaluations can be more likely to bias toward the history exposure mechanism as it decided to what products the users might express their preferences. The disagreement between the online and offline evaluations may partly explain the controversial observations made in several recent papers, in which deep recommendation models are overwhelmed by classical collaborative filtering approaches in offline evaluations, despite their many successful deployments in the real-world applications.

In a number of embodiments, to address the above dilemmas for recommender systems, the idea of counterfactual modeling can be used to redesign the learning and evaluation methods. Counterfactual modeling can answer questions related to "what if", e.g., what is the feedback data if the candidate model were deployed. The counterfactual methods can take account of the dependency between the feedback data and exposure. Conventional attempts have relied on excessive data or model assumptions, such as the missing-data model described below, which may not be satisfied in practice. Many of the assumptions can be essentially unavoidable due to a fundamental discrepancy between the recommender system and observational studies. In observational studies, the exposure (treatment) status can be fully observed, and the exposure mechanism can be completely decided by the covariates (features). For recommender systems, the exposure can be partially captured by the feedback data. The complete exposure status can be retrieved from the system's backend log, to which access can be highly restricted, and such access rarely exists for the public datasets. Also, the exposure mechanism can depend on intractable randomness, e.g., burst events, special offers, interference with other modules such as the advertisement, as well as the relevant features that are not attainable from feedback data.

Figure 4:
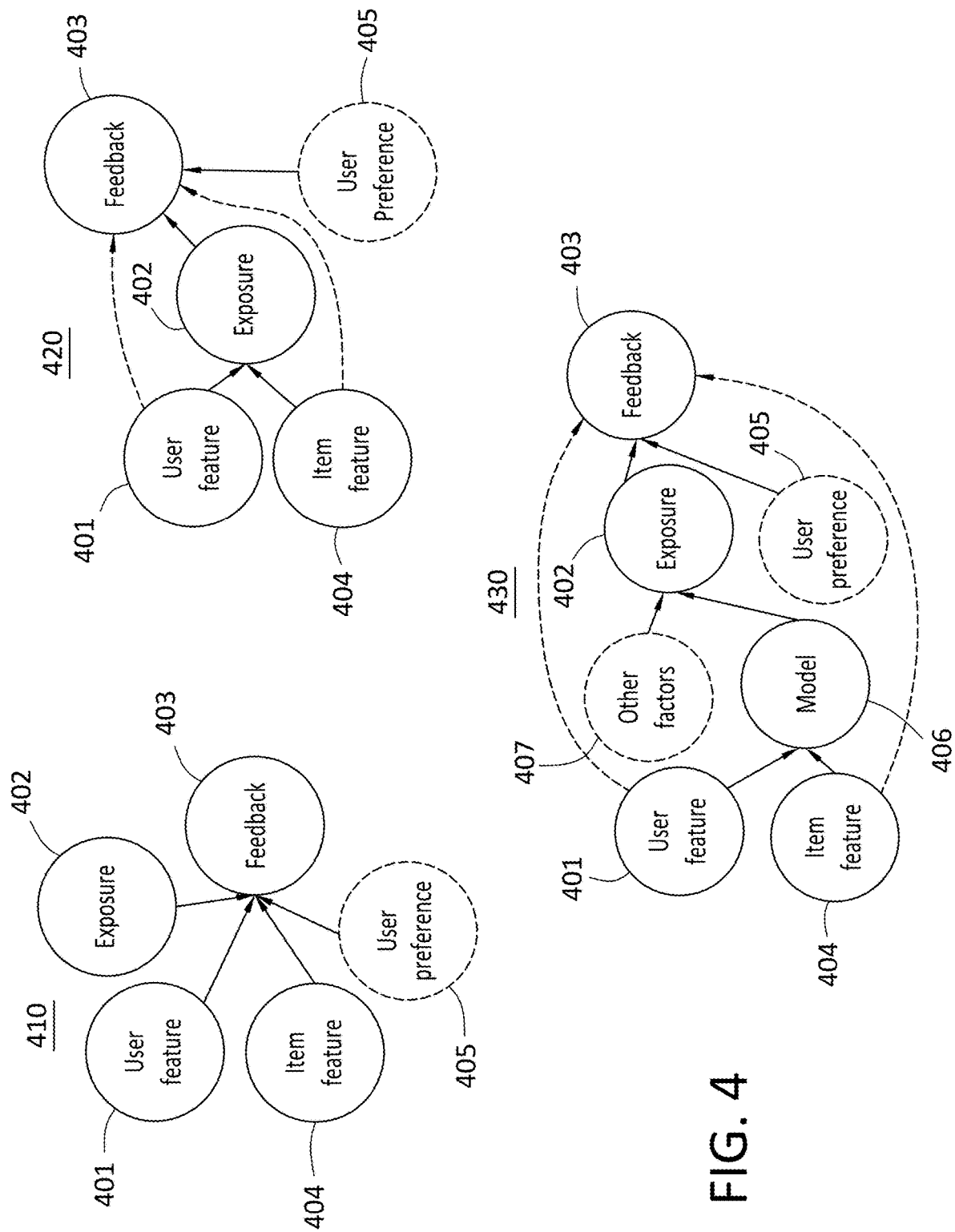
FIG. 4 illustrates block diagrams for three different settings of causal inference views.

Turning ahead in the drawings, FIG. 4 illustrates block diagrams for three different settings of causal inference views. For example, in a setting 410, feedback 403 can be based on exposure 402, user features 401, item feature 404, and, in some cases, use preferences 405. In a setting 420, exposure 402 can be based on user features 401 and item features 404, and feedback can be based on exposure, and in some cases, on user preferences 405, user features 401, and/or item features 404. In a setting 430, model 406 can be based on user features 401 and item features 404, and exposure 402 can be based on model 406, and in some cases, on other factors 407. Feedback 403 can be based on exposure 402, and in some cases, on user preferences 405, user features 401, and/or item features 404. A direct consequence of the above differences between settings 410, 420, and 430 can be that the exposure mechanism is not identifiable from feedback data, i.e., the conditional distribution characterized by the exposure mechanism can be modified without disturbing the observation distribution. Therefore, the conventional methods can make problem-specific and/or unjustifiable assumptions in order to bypass or simply ignore the identifiability issue.

In a number of embodiments, the techniques described herein can acknowledge the uncertainty brought by the identifiability issue and treat it as an adversarial component. A minimax setting can be used in which the candidate model can be optimized over the worst-case exposure mechanism. By applying duality arguments and relaxations, the minimax problem can be converted to an adversarial game between two recommendation models. This approach is novel and principled, which can advantageously provide a theoretical analysis to show an inconsistent issue of supervised learning on recommender systems, which is caused by the unknown exposure mechanism. A minimax setting for counterfactual recommendation can beneficially be used and converted to a tractable two-model adversarial game. The generalization bounds for the adversarial learning described herein are shown, with analysis for the minimax optimization. Simulation and real data experiments demonstrate performance benefits of the techniques described herein.

Bold-faced letters are used to denote vectors and matrices, upper-case letters to denote random variables and the corresponding lower-case letters to denote observations. Distributions are denoted by P and Q. Let $x_u$ be the user feature vector for user $u \in \{1, \ldots, n\}$, $z_i$ be the item feature vector for item $i \in \{1, \ldots, m\}$, $O_{u,i} \in \{0,1\}$ be the exposure status, $Y_{u,i}$ be the feedback, and D be the collected user-item pairs where non-positive interactions may come from negative sampling. The feature vectors can be one-hot encoding or embedding, so this approach can be fully compatible with deep learning models that leverage representation learning and are trained under negative sampling. Recommendation models are denoted by such as $f_\theta$ and $g_\psi$. They take $x_u$, $z_i$ (and the exposure $O_{u,i}$ if available) as input. The shorthand $f_\theta$ (u, i) is used to denote the output score, and the loss with respect to the $\mathcal{Y}$ is given by $\delta(\mathcal{Y}_{u,i}, f_\theta (u, i))$. These notations also apply to the sequential recommendation by encoding the previously-interacted items to the user feature vector x.

$Pg(O_{u,i}|x_u, z_i)$ is used to denote the exposure mechanism that depends on the underlying model g. Also, $p(Y_{u,i}|O_{u,i}, x_u, z_i)$ gives the user response, which is independent from the exposure mechanism whenever $O_{u,i}$ is observed. The stochasticity in the exposure can also be induced by the exogenous factors (unobserved confounders) who bring extra random perturbations. Explicit and implicit feedback settings are not explicitly differentiated unless specified.

Supervised Learning for Feedback Data

Let $Y_{u,i} \in \{-1, 1\}$ be the implicit feedback. Set aside the exposure for a moment, the goal of supervised learning is to determine the optimal recommendation function that minimizes the surrogate loss:

$$\ell\phi(f_\theta) = \frac{1}{|D|} \sum_{(u,i) \in D} [\phi(Y_{u,i} \cdot f_\theta(u, i))],$$

where $\phi$ induces the widely-adopted margin-based loss. Now take account of the (unobserved) exposure status by first letting:

$p^{(1)}(o) = p(Y_{u,i} = 1, O_{u,i} = o, x_u, z_i),$ $p^{(-1)}(o) = p(Y_{u,i} = -1, O_{u,i} = o, x_u, z_i), o \in \{0,1\},$ to denote the joint distribution for positive and negative feedback under either exposure status. The surrogate loss, which now depends on $p^{(1)}$ and $p^{(-1)}$ due to including the exposure, is denoted by $L_\phi(f_\theta, \{p^{(1)}, p^{(-1)}\})$. In assertion 1, it is shown that if the exposure mechanism is fixed and $f_\theta$ is optimized, the optimal loss and the corresponding $f^*_\theta$ depend merely on $p^{(1)}$ and $p^{(-1)}$.

Assertion 1. When the exposure mechanism $p(O_{u,i}|X_u, Z_i)$ is given and fixed, the optimal loss is:

$$\inf_{f_\theta} L_\phi(f_\theta, \{p^{(1)}, p^{(-1)}\}) = -D_c(P^{(1)} \| (P^{(-1)}), \qquad (1)$$

where $P^{(1)}$ and $P^{(-1)}$ are the corresponding distributions for $p^{(1)}$ and $p^{(-1)}$, and $$D_c(P^{(1)} \| (P^{(-1)}) = \int c\left(\frac{p^{(1)}}{p^{(-1)}}\right) dP^{(-1)}$$

is the f-divergence induced by the convex, lower-semicontinuous function c. Also, the optimal $f^*_\theta$ that achieves the infimum is given by $$\alpha^*_\theta\left(\frac{p^{(1)}}{p^{(-1)}}\right)$$

for some function $\alpha^*_\theta$ that depends on $\phi$.

The proof of Assertion 1 is provided as follows:

Proof. When taking the exposure mechanism into account, minimizing $f_\theta$ over the loss is implicitly doing $\inf_{f_\theta} L_\phi(f_\theta, \{p^{(1)}, p^{(-1)}\})$, where $$L_\phi(f_\theta, \{p^{(1)}, p^{(-1)}\}) = \mathbb{E}[\phi(Y \cdot f_\theta(x, z; O))] = \sum_{o \in \{0,1\}} \phi(f_\theta(x, z; O = o))p^{(1)}(o) + \phi(-f_\theta(x, z; O = o))p^{(-1)}(o).$$

For any fixed exposure mechanism p(O|x, z), there is $$\inf_{f_\theta} L_\phi(f_\theta, \{p^{(1)}, p^{(-1)}\}) = \qquad (A.1)$$

$$\sum_{o \in \{0, 1\}} \inf_\alpha \{\phi(\alpha)p^{(1)}(o) + \phi(-\alpha)p^{(-1)}(o)\} =$$

$$\sum_{o \in \{0,1\}} p^{(1)}(o) \inf_\alpha \left\{\phi(\alpha) + \phi(-\alpha)\frac{p^{(-1)}(o)}{p^{(1)}(o)}\right\}.$$

For each $o \in \{0, 1\}$, let $\mu(o) = p^{(-1)}(o)/p^{(1)}(o)$ and $\Delta(\mu) = -\inf_\alpha(\phi(\alpha) + \phi(-\alpha\mu))$.

Notice that $\Delta(\mu)$ is a convex function of $\mu$ since the supremum (negative of the infimum) over a set of affine functions is convex. Since $\Delta$ is convex and continuous:

$$\inf_{f_\theta} L_\phi(f_\theta, \{p^{(1)}, p^{(-1)}\}) = - \sum_{o \in \{0, 1\}} p^{(1)}(o) \Delta\left(\frac{p^{(-1)}(o)}{p^{(1)}(o)}\right),$$

which is exactly the f-divergence $D_\Delta(P^{(1)} \| P^{(-1)})$ and induced by $\Delta$.

Also, up on achieving the infimum in (A.1), the optimal $f_\theta$ is given by solving $\alpha_0^*(\mu) = \arg\min_\alpha (\phi(\alpha) + \phi(-\alpha)\mu)$.

Notice that the joint distribution can be factorized into: $p(Y_{u,i}|o_{u,i}, x_u, x_i) \propto (Y_{u,i}|o_{u,i}, x_u, z_i) \cdot Pg(o_{u,i}|x_u, z_i)$, so Assertion 1 implies that:

$$f_\theta^*(x_u, z_i; o_{u,i}) = \alpha_0^*(p(Y_{u,i}=1|o_{u,i}, x_u, z_i)/p(Y_{u,i}=-1|o_{u,i}, x_u, z_i)).$$

In conclusion: (1) when the exposure mechanism is given, the optimal loss $-D_c(P^{(1)}\|P^{(-1)})$ is a function of both the user preference and the exposure mechanism; (2) the optimal model $f^*_\theta$ depends merely on the user preference, because $f^*_\theta$ is a function of $p(Y|o,x,z)$ which does not depend on the exposure mechanism (mentioned at the beginning of this section). Both conclusions are practically reasonable, as the optimal recommendation model should detect user preference regardless of the exposure mechanisms. The optimal loss, on the other hand, depends on the joint distribution in which the underlying exposure mechanism plays a part.

However, when $p(O_{u,i}|X_u, Z_i)$ is unknown, the conclusions from Assertion 1 no longer hold, and the optimal $f^*_\theta$ will depend on the exposure mechanism. As a consequence, if the same feedback data were collected under different exposure mechanisms, the recommendation model may find the user preference differently. The inconsistency is caused by not accounting for the unknown exposure mechanism from the supervised learning.

The Propensity-Weighting Approach

In causal inference, the probability of exposure given the observed features (covariates) is referred to as the propensity score. The propensity-weighting approach uses weights based on the propensity score to create a synthetic sample in which the distribution of observed features is independent of exposure. This approach can be beneficial to make the feedback data independent of the exposure mechanism. The propensity-weighted loss is constructed via:

$$\frac{1}{|D|}\Sigma_{(u,i)\in D}\phi\frac{(y_{u,i} \cdot f_\theta(x_u, z_i))}{p(O_{u,i}|X_u, Z_i)}$$

and by taking the expectation with respect to exposure (whose distribution is denoted by Q), the ordinary loss recovered is:

$$\mathbb{E}_Q\left[\frac{1}{|D|}\sum_{(u,i)\in D}\frac{\phi(y_{u,i} \cdot f_\theta(x_u, z_i))}{p(O_{u,i}=1|x_u, z_i)}\right] = \quad (2)$$

$$\mathbb{E}_{P_n}\left[\frac{\phi(Y \cdot f_\theta(X, Z))}{p(O=1|X, Z)}p(O=1|X, Z)\right] = \ell_\phi(f_\theta),$$

where the second expectation is taken with respect to the empirical distribution $P_n$. Let $Q_o$ be the distribution for the underlying exposure mechanism. The propensity-weighted empirical distribution is then given by $P_n/Q_o$ (after scaling), which can be thought of as the synthetic sample distribution after eliminating the influence from the underlying exposure mechanism. It is straightforward to verify that after scaling, the expected propensity-weighted loss is exactly given by: $\mathbb{E}_{P_{n/Q_o}}[\phi(Y \cdot f_\theta(X, Z))]$.

The Hidden Assumption of the Missing-Data (Click) Model

Conventional approaches known as the "click model" deal with the unidentifiable exposure mechanism by assuming a missing-data model:

$$p(\text{click}=1|x) = p(\text{expose}=1|x) \cdot p(\text{relevance}=1|x). \quad (3)$$

While the click model greatly simplifies the problem because the exposure mechanism can now be characterized explicitly, it relies on a hidden assumption that is rarely satisfied in practice. Use R to denote the relevance and Y to denote the click. The fact that $Y=1 \Leftrightarrow O=1$ and $R=1$ implies:

$$p(Y=1|x) =$$
$$p(O=1, R=1|x) = p(O=1|x) \cdot p(R=1|O=1, x)$$
$$\stackrel{(3)}{\Rightarrow} p(R=1|O=1, x) = p(R=1|x),$$

which suggests that being relevant is independent of getting exposed given the features. This is rarely true (or at least cannot be examined) in many real-world problems, unless x contains every single factor that may affect the exposure and user preference. By contrast, in many embodiments, the techniques described herein can provide a robust solution when the hidden assumption of the missing-data (click) model is dubious or violated.

Method

Let P* be the ideal exposure-eliminated sample distribution corresponding to $P/Q_o$, according to the underlying exposure mechanism $Q_o$ and data distribution P. For notation simplicity, without overloading the original meaning by too much, from this point P, $P_n$, $Q_o$ and P* can be treated as distributions on the sample space X which includes all the observed data $(x_u, z_i, \mathcal{Y}_{u,i})$ with $(u, i) \in D$. Since there are not data or model assumptions made to allow for accurately recovering P*, a minimax formulation is introduced to characterize the uncertainty and optimize $f_\theta$ against the worst possible choice of (a hypothetical) $\hat{P}$, whose discrepancy with the ideal P* can be determined by the data to a neighborhood: $\text{Dist}(P^*, \hat{P}) < \rho$. Among the divergence and distribution distance measures, the Wasserstein distance can be chosen for this problem, which is defined as:

$$W_c(\hat{P}, P^*) = \inf_{\gamma \in \pi(\hat{P}, P^*)} \mathbb{E}_{((x,z,y),(x',z',y')) \sim \gamma}[c((x, z, y), (x', z', y'))], \quad (4)$$

where $c: X \times X \to [0, +\infty)$ is the convex, lower semicontinuous transportation cost function with $C(t, t)=0$, and $\Pi(\hat{P}, P^*)$ is the set of all distributions whose marginals are given by $\hat{P}$ and P*. Intuitively, the Wasserstein distance can be interpreted as the minimum cost associated with transporting mass between probability measures. The Wasserstein distance can be chosen instead of others in order to understand how to transport from the empirical data distribution to an ideal synthetic data distribution where the observations were independent of the exposure mechanism. Hence, the local minimax empirical risk minimization (ERM) problem can be considered:

$$\underset{f_\theta \in F}{\text{minimize}} \underset{W_c(P^*, \hat{P}) < \rho}{\sup} \mathbb{E}_{\hat{P}}[\delta(Y, f_\theta(X, Z))], \quad (5)$$

which can directly account for the uncertainty induced by the lack of identifiability in the exposure mechanism, and can optimize $f_\theta$ under the worst possible setting. However, the formulation in (5) is first of all a constraint optimization problem. Secondly, the constraint is expressed in terms of the hypothetical P*. After applying a duality argument, the dual problem can be expressed via the exposure mechanism in the following Assertion 2. $\hat{Q}$ is used to denote some estimation of $Q_o$.

Assertion 2. Suppose that the transportation cost c is continuous and the propensity score are all bounded away from zero, i.e., $\rho(O_{i,u}=1|x_u, z_i) \geq \mu$. Let $P=\{P:W_c(P^*, P) \leq \rho\}$, then $$\sup_{\hat{P} \in P} \mathbb{E}_{\hat{P}}[\delta(Y, f_\theta(X, Z))] =$$

$$\inf_{\alpha \geq 0} \left\{ \alpha\rho + \sup_{\hat{Q}} \left\{ \mathbb{E}_P\left[\frac{\delta(Y, f_\theta(X,Z))}{\hat{q}(O=1|X,Z)}\right] - c_0\alpha W_c\left(\hat{Q}^{-1}, Q_0^{-1}\right) \right\} \right\},$$

where $c_o$ is a positive constant and $\hat{q}$ is the density function associated with $\hat{Q}$.

The proof of Assertion 2 is provided as follows, which first proves the dual formulation for the minimax ERM stated in Assertion 2, and then discusses the relaxation for the dual problem:

Proof. For the estimation $\hat{P}=P/\hat{Q}$ of the ideal exposure-eliminated sample, $W_c(\hat{P}, P^*) \leq \rho$ is equivalent to $W_c(P/\hat{Q}, P/Q_o) \leq \rho$.

Observe that when P is given by the empirical distribution that assigns uniform weights to all samples, the Wasserstein's distance $W_c(P/\hat{Q}, P/Q_o) \leq \rho$ is convex in $\hat{Q}^{(-1)}$ (since c is convex) and $\hat{Q}=Q_o$ gives $W_c(P/\hat{Q}, P/Q_o)=0$.

Since the propensity scores are assumed to be all bounded away from zero, so $P/\hat{Q}$ and $P/Q_o$ exist and have normal behavior. So the duality results can be established, since the Slater's condition holds. Let $h=(x, z, y) \in X$ and X' be a copy of X. Thus:

$$\sup_{\hat{P}: W_c(\hat{P}, P) \leq \rho} \int \delta(y, f_\theta(x, z)) d\hat{P}(h) = \qquad (A.2)$$

$$\sup_{\hat{Q}: W_c(P/\hat{Q}, P/Q_0) \leq \rho} \int \frac{\delta(y, f_\theta(x, z))}{\hat{q}(O=1|x, z)} d\hat{Q}(h) =$$

$$\inf_{\alpha \geq 0} \sup_{\hat{Q}} \left\{ \int \frac{\delta(y, f_\theta(x, z))}{\hat{q}(O=1|x, z)} d\hat{Q}(h) - \alpha W_c\left(\frac{P}{\hat{Q}}, \frac{P}{Q_0}\right) \propto \rho \right\} =$$

$$\inf_{\alpha \geq 0} \sup_{\hat{Q}} \left\{ \int \frac{\delta(y, f_\theta(x, z))}{\hat{q}(O=1|x, z)} d\hat{Q}(h) - \alpha \right.$$

$$\left. \gamma \in \prod(P/\hat{Q}, P/Q_0) \int c(h, h') d\gamma(h, h') + \alpha \rho \right\} = \inf_{\alpha \geq 0} \sup_{\hat{Q}}$$

$$\gamma \in \prod(P/\hat{Q}, P/Q_0) \left\{ \int \left(\frac{\delta_{f_\theta}(h)}{\hat{q}(h)} - \alpha c(h, h')\right) d\gamma(h, h') + \alpha \rho \right\}$$

where in the last line the shorthand notation $\delta_{f_\theta}(h):=\delta(y, f_\theta(x, z))$ and $\hat{q}(h):=\hat{q}(O=1|x, z)$ are used. Then notice that $$\sup_{\hat{Q}} \sup_{\gamma \in \prod\left(\frac{P}{\hat{Q}}, \frac{P}{Q_0}\right)} \int \left(\frac{\delta_{f_\theta}(h)}{\hat{q}(h)} - \alpha c(h, h')\right) d\gamma(h, h') \leq \qquad (A.3)$$

$$\int_{\sup_{h \in X}} \left(\frac{\delta_{f_\theta}(h)}{\hat{q}(h)} - \alpha c(h, h')\right) dQ_0(h')$$

and it is then shown that the opposite direction also holds so it is always equality. Let $\mathcal{K}$ be the space of measurable conditional distributions (Markov kernels) from X to X', then $$\sup_{\hat{Q}} \sup_{\gamma \in \prod\left(\frac{P}{\hat{Q}}, \frac{P}{Q_0}\right)} \int \left(\frac{\delta_{f_\theta}(h)}{\hat{q}(h)} - \alpha c(h, h')\right) d\gamma(h, h') \geq \qquad (A.4)$$

$$\sup_{K \in \mathcal{K}} \int \left(\frac{\delta_{f_\theta}(h)}{\hat{q}(h)} - \alpha c(h, h')\right) dK(h|h') dQ_0(h')$$

In the next step, consider the space of all measurable mappings h' $\mapsto$ h(h') from X' to X, denoted by $\mathcal{H}$. Since all the mappings are measurable, the underlying spaces are regular, and $\delta_{f_\theta}$ and c are at least semi-continuous, using standard measure theory arguments for exchanging the integration and supremum, yields $$\sup_{h(\cdot) \in \mathcal{H}} \int \left(\frac{\delta_{f_\theta}(h(h'))}{\hat{q}(h(h'))} - \alpha c(h(h'), h')\right) dQ_0(h') = \qquad (A.5)$$

$$\int \sup_{h \in X} \left(\frac{\delta_{f_\theta}(h)}{\hat{q}(h)} - \alpha c(h, h')\right) dQ_0(h')$$

where the $h(\cdot)$ on the LHS represents the mapping, and the h on the RHS still denotes elements from the sample space X. Now let the support of the conditional distribution K(h, h') be given by h(h'). So according to (A.5):

$$\sup_{K \in \mathcal{K}} \int \left(\frac{\delta_{f_\theta}(h)}{\hat{q}(h)} - \alpha c(h, h')\right) dK(h|h') dQ_0(h') = \qquad (A.6)$$

$$\sup_{h(\cdot) \in \mathcal{H}} \int \left(\frac{\delta_{f_\theta}(h(h'))}{\hat{q}(h(h'))} - \alpha c(h(h'), h')\right) dQ_0(h') \geq$$

$$\int_{\sup_{h \in X}} \left(\frac{\delta_{f_\theta}(h)}{\hat{q}(h)} - \alpha c(h, h')\right) dQ_0(h') \geq$$

$$\sup_{\hat{Q}} \sup_{\gamma \in \prod\left(\frac{P}{\hat{Q}}, \frac{P}{Q_0}\right)} \int \left(\frac{\delta_{f_\theta}(h)}{\hat{q}(h)} - \alpha c(h, h')\right) d\gamma(h, h')$$

Combining (A.6), (A.4) and (A.3), see that $$\sup_{\hat{Q}} \sup_{\gamma \in \prod\left(\frac{P}{\hat{Q}}, \frac{P}{Q_0}\right)} \int \left(\frac{\delta_{f_\theta}(h)}{\hat{q}(h)} - \alpha c(h, h')\right) d\gamma(h, h') = \qquad (A.7)$$

$$\int_{\sup_{K \in X}} \left(\frac{\delta_{f_\theta}(h)}{\hat{q}(h)} - \alpha c(h, h')\right) dQ_0(h')$$

Finally, notice that $$\sup_{\hat{Q}} \sup_{\gamma \in \prod\left(\frac{P}{\hat{Q}}, \frac{P}{Q_0}\right)} \int \left(\frac{\delta_{f_\theta}(h)}{\hat{q}(h)} - \alpha c(h, h')\right) d\gamma(h, h') =$$

$$\sup_{\hat{Q}} \int \frac{\delta_{f_\theta}(h)}{\hat{q}(h)} dQ_0(h) - \alpha W_c(P/\hat{Q}, P/Q_0)$$

so according to (A.2), reach the final result:

$$\sup_{\hat{P}:W_c(\hat{P},P)\le p} \int \delta(y, f_\theta(x,z))d\hat{P}(h) = \quad\quad\quad (A.8)$$

$$\inf_{\alpha \ge 0}\left\{\alpha p + \int_{\sup_{h \in X}}\left(\frac{\delta_{f_\theta}(h)}{\hat{q}(h)} - \alpha c(h,h')\right)dQ_0(h')\right\} =$$

$$\inf_{\alpha \ge 0}\left\{\alpha p + \sup_{\hat{Q}} \int \frac{\delta_{f_\theta}(h)}{\hat{q}(h)}d\hat{Q}_0(h) - \alpha W_c(P/\hat{Q}, P/Q_0)\right\}$$

To reach the relaxation given in (5), use the alternate expression for the Wasserstein distance obtained from the Kantorovich-Rubinstein duality. Denote the Lipschitz continuity for a function $f$ by $\|f\|_{L\le l}$. When the cost function c is l-Lipschitz continuous, $W_c(P_1, P_2)$ is also referred to as the Wasserstein-1 distance. Without loss of generality, consider $\|c\|_{L\le 1}$ such as the $\ell_2$ norm, and with that the Wasserstein distance is equivalent to:

$$W_c(P/\hat{Q},P/Q_0) = \sup_{\|f\|_{L\le 1}}\left\{\mathbb{E}_{h\sim P_n/\hat{Q}}f(h) - \mathbb{E}_{h\sim P/Q_0}f(h)\right\} \quad (A.9)$$

where $f:\chi \to \mathbb{R}$. In practice, when P is the empirical distribution that assigns uniform weights to all the samples:

$$W_c(P/\hat{Q},P/Q_0) = \sup_{\|f\|_{L\le 1}}\left\{\mathbb{E}_{h\sim P_n/\hat{Q}}f(h) - \mathbb{E}_{h\sim P_n/Q_0}f(h)\right\} = \quad (A.10)$$

$$\sup_{\|f\|_{L\le 1}}\left\{a_1\mathbb{E}_{h\sim P_n}\frac{f(h)}{\hat{q}(h)} - a_2\mathbb{E}_{h\sim P_n}\frac{f(h)}{q_0(h)}\right\} =$$

$$\sup_{\|f\|_{L\le 1}}\mathbb{E}_{h\sim P_n}\left[\frac{f(h)}{\hat{q}(h)\cdot q_0(h)}(a_1 q_0(h) - a_2\hat{q}(h))\right] \le$$

$$\sup_{h\in X}\left\{\frac{1}{\hat{q}(h)\cdot q_0(h)}\right\}\cdot \sup_{\|f\|_{L\le 1}}\left\{a_3\mathbb{E}_{h\sim P_n Q_0}f(h) - a_4\mathbb{E}_{h\sim P_n/\hat{Q}}f(h)\right\} \le$$

$$\frac{1}{\mu^2}\sup_{\|f\|_L \le \max\{a_5,a_6\}}\left\{\mathbb{E}_{h\sim Q_0}f(h) - \mathbb{E}_{h\sim \hat{Q}}f(h)\right\} \le \frac{1}{\mu^2}W_{\tilde{c}}(\hat{Q},Q_0)$$

where the-above $a_i$ are all constants induced by using the change-of-measure with important-weighting estimators, and the induced cost function $\tilde{c}$ on the last line satisfies $|\tilde{c}|_L \le \max\{a_5, a_6\}$. Therefore, see that the Wasserstein distance between $P_n/\hat{Q}$ and $P_n/Q_0$ can be bounded by $W_{\tilde{c}}(\hat{Q}, Q_0)$. Hence, for each $\alpha \ge 0$ in (A.8), $$\sup_{\hat{Q}}\mathbb{E}_P\left[\frac{\delta(Y,f_\theta(X,Z))}{\hat{q}(O=1|X,Z)\cdot q_0(h)}\right] - \alpha W_{\tilde{c}}(\hat{Q},Q_0),\ \alpha \ge 0,$$

is a relaxation of the result in Assertion 2. In practice, the specific forms of the cost functions c or $\tilde{c}$ do not matter, because the Wasserstein distance is intractable and the data-dependent surrogates discussed below in connection with practical implementations can be used.

Considering the relaxation for each fixed $\alpha$ (see the appendix), the minimax objective has a desirable formulation where $\alpha$ becomes a tuning parameter:

$$\underset{f_\theta \in F}{\text{minimize}}\ \sup_{\hat{Q}}\ \mathbb{E}_P\left[\frac{\delta(Y,f_\theta(X,Z))}{\hat{q}(O=1|X,Z)}\right] - \alpha W_c(\hat{Q},Q_0)\ \alpha \ge 0. \quad (6)$$

To make sense of (6), see that while $\hat{Q}$ is acting adversarially against $f_\theta$ as the inverse weights in the first term, it cannot arbitrarily increase the objective function, since the second terms acts as a regularizer that keeps $\hat{Q}$ close to the true exposure mechanism $Q_0$. Compared with the primal problem in (5), the relaxed dual formulation in (6) gives the desired unconstrained optimization problem. Also, note that the exposure mechanism is often given by the recommender system that was operating during the data collection, which can be leveraged as a domain knowledge to further convert (6) to a more tractable formulation. Let g* be the recommendation model that underlies $Q_0$. Assume for now that $P_g$ (O=1|X,Z) is given by $G(g(X,Z)) \in (\mu, 1)$, $\mu > 0$ for some transformation function G. The inclusion and manipulation of the unobserved factors is discussed below in connection with practical implementations. The objective in (6) can then be converted to a two-model adversarial game:

$$\underset{f_\theta \in F}{\text{minimize}}\ \sup_{g_\psi \in \mathcal{G}}\ \mathbb{E}_P\left[\frac{\delta(Y,f_\theta(X,Z))}{G(g_\psi(X,Z))}\right] - \alpha W_c(G(g_\psi), G(g^*)), \quad (7)$$

$$\alpha \ge 0.$$

Before discussing the implications of (7), its practical implementations, and the minimax optimization, the theoretical guarantees for the generalization error are shown and discussed, in comparison to the standard ERM setting, after introducing the adversarial component.

Theoretical Property

Before stating results, the loss function corresponding to the adversarial objective can be characterized, as well as the complexity of the hypothesis space. For the first purpose, the cost-regulated loss is introduced, which is defined as:

$$\Delta_\gamma(f_\theta;(x,z,y)) =$$

$$\sup_{(x',z',y')\in x}\left\{\frac{\delta(y',f_\theta(x',z'))}{q(O=1|x',z')} - \gamma c((x,z,y),(x',z',y'))\right\},$$

For the second purpose, consider the entropy integral $J(\tilde{\mathcal{F}}) = \int_0^\infty \sqrt{\log \mathcal{N}(\epsilon, \tilde{\mathcal{F}}, \|.\|_\infty)}d\epsilon$, where $\tilde{\mathcal{F}} = \{\delta(f_\theta,.)|f_\theta \in \mathcal{F}\}$ is the hypothesis class and $\mathcal{N}(\epsilon; \tilde{\mathcal{F}}, \|.\|_\infty)$ gives the covering number for the $\epsilon$-cover of $\tilde{\mathcal{F}}$ in terms of the $\|.\|_\infty$ norm. Suppose that $|\delta(y, f_\theta(x,z))| \ge M$ holds uniformly. The theoretical result on the worst-case generalization bound under the minimax setting.

Theorem 1. Suppose the mapping G from $g_\psi$ to $q(o=1|x,z)$ is to one-to-one and surjective with $g_\psi \in \mathcal{G}$. Let $\tilde{\mathcal{G}}(\rho) = \{g \in \mathcal{G}\ |W_c(G(g^*)) \le \rho\}$. Then under the conditions specified in Assertion 2, for all $\gamma \ge 0$ and $\rho > 0$, the following inequality holds with probability at least $1-\epsilon$:

$$\sup_{g_\psi \in \hat{\mathcal{G}}(\rho)} \mathbb{E}_P\left[\frac{\delta(Y, f_\theta(X, Z))}{G(g_\psi(X, Z))}\right] \le$$

$$c_1\gamma\rho + \mathbb{E}_{P_n}[\Gamma\Delta_\gamma(f_\theta; (X, Z, Y))] + \frac{24\mathcal{J}(\tilde{\mathcal{F}}) + c_2\left(M, \sqrt{\log\frac{2}{\epsilon}}, \gamma\right)}{\sqrt{n}},$$

where $c_1$ is a positive constants and $c_2$ is a simple linear function with positive weights.

The proof of Theorem 1 is provided as follows:

Proof Following the same arguments from the proof in Assertion 2, a result similar to that stated in (A.8) is $$\sup_{g_\psi \in \hat{\mathcal{G}}(\rho)} \mathbb{E}_P\left[\frac{\delta(Y, f_\theta(X, Z))}{G(g_\psi(X, Z))}\right] \le \quad (A.11)$$

$$\inf_{\gamma \ge 0}\left\{\gamma\rho + \int \sup_{h \in \mathcal{X}}\left(\frac{\delta_{f_\theta}(h)}{\hat{q}(h)} - \gamma c(h, h')\right)dP(h)\right\} =$$

$$\inf_{\gamma \ge 0}\{\gamma\rho + \mathbb{E}_P[\Delta_\gamma(f_\theta; H)]\}$$

(by the definition of $\Delta_\gamma$) $\le \inf_{\gamma \ge 0}$ $$\left\{\gamma\rho + \mathbb{E}_{P_n}[\Delta_\gamma(f_\theta; H)] + \sup_{f_\theta \in \mathcal{F}}(\mathbb{E}_P[\Delta_\gamma(f_\theta; H)] - \mathbb{E}_{P_n}[\Delta_\gamma(f_\theta; H)])\right\}.$$

Let $W_\gamma = \sup_{f_\theta \in \mathcal{F}}(\mathbb{E}_P[\Delta_\gamma(f_\theta; H)] - \mathbb{E}_{P_n}[\Delta_\gamma(f_\theta; H)])$, then notice that $$W_\gamma = \frac{1}{n}\sup_{f_\theta \in \mathcal{F}}\left[\sum_{i=1}^N \mathbb{E}_P[\Delta_\gamma(f_\theta; H)] - \Delta_\gamma(f_\theta; H_i)\right] \gamma \ge 0.$$

Since $|\delta_{f_\theta}(h)| \le \mu M$ holds uniformly, according to the McDiarmid's inequality on bounded random variables:

$$p\left(W_\gamma - \mathbb{E}W_\gamma \ge \mu M \sqrt{\frac{\log 1/\epsilon}{2n}}\right) \le \epsilon. \quad (A.12)$$

Then let $\epsilon_1, \ldots, \epsilon_N$ be the i.i.d Rademacher random variables independent of H, and $H'_i$ be the i.i.d copy of $H_i$ for $i=1, \ldots, N$.

Applying the symmetrization argument, see that $$\mathbb{E}W_\gamma = \mathbb{E}\left[\sup_{f_\theta \in \mathcal{F}}\left|\sum_{i=y}^N \Delta_\gamma(f_\theta; H'_i) - \sum_{i=y}^N \Delta_\gamma(f_\theta; H_i)\right|\right] = \quad (A.13)$$

$$\mathbb{E}\left[\sup_{f_\theta \in \mathcal{F}}\left|\frac{1}{N}\sum_{i=1}^N \epsilon_1\Delta_\gamma(f_\theta; H'_i) - \frac{1}{N}\sum_{i=1}^N \Delta_\gamma(f_\theta; H_i)\right|\right] \le$$

$$2\mathbb{E}\left[\sup_{f_\theta \in \mathcal{F}}\left|\frac{1}{N}\sum_{i=1}^N \epsilon_1\Delta_\gamma(f_\theta; H_i)\right|\right].$$

It is clear that each $\epsilon_i \Delta_\gamma(f_\theta; H_i)$ is zero-mean, and it is now shown that it is sub-Gaussian as well.

For any two $f_\theta, f'_\theta$, the bounded difference is shown:

$$\mathbb{E}\left[\exp\left(\lambda\left(\frac{1}{\sqrt{N}}\epsilon_i\Delta_\gamma(f_\theta; H_i) - \frac{1}{\sqrt{N}}\epsilon_i\Delta_\gamma(f'_\theta; H_i)\right)\right)\right] = \quad (A.14)$$

$$\left(\mathbb{E}\left[\exp\left(\frac{\lambda}{\sqrt{N}}\epsilon_1(\Delta_\gamma(f_\theta; H_1) - \Delta_\gamma(f^1_\theta; H_1))\right)\right]\right)^N =$$

$$\left(\mathbb{E}\left[\exp\left(\frac{\lambda}{\sqrt{N}}\epsilon_1\left(\sup_{h'}\inf_{h''}\left\{\frac{\delta_{f_\theta}(h')}{q(h')} - \gamma c(H_1, h') - \frac{\delta_{f'_\theta}(h'')}{q(h'')}\right\} + \gamma c(H_1, h'')\right)\right)\right]\right)^N$$

$$\le \left(\mathbb{E}\left[\exp\left(\frac{\lambda}{\sqrt{N}}\epsilon_1\left(\sup_{h'}\left\{\frac{\delta_{f_\theta}(h')}{q(h')} - \frac{\delta_{f'_\theta}(h')}{q(h')}\right\}\right)\right)\right]\right)^N \le$$

$$\exp\left(\lambda^2 \left\|\frac{\delta_{f_\theta}}{q} - \frac{\delta_{f'_\theta}}{q}\right\|_\infty^2 / 2\right)$$

(by Hoeffding's inequality).

Hence, see that $$\frac{1}{\sqrt{N}}\epsilon_i\Delta_\gamma(f_\theta; H_i)$$

is sub-Gaussian with respect to $$\left\|\frac{\delta_{f_\theta}}{q} - \frac{\delta_{f'_\theta}}{q}\right\|_\infty^2.$$

Therefore, $\mathbb{E} W_\gamma$ can be bounded by using the standard technique for Rademacher complexity and Dudley's entropy integral:

$$\mathbb{E}W_\gamma \le \frac{24}{N}\mathcal{J}(\tilde{\mathcal{F}}). \quad (A.15)$$

Combining all the above bounds in (A.11), (A.12) and (A.15) obtains the desired result.

The generalization bound in Theorem 1 holds for all $\rho$ and $\delta$, and is it shown that when they are decided by some data-dependent quantities, the result can be converted to some simplified forms that reveal the more direct connections with the propensity-weighted loss and standard ERM results:

Corollary 1. Following the statements in Theorem 1, there exists some data-dependent $\gamma_n$ and $p_n(f_\theta)$, such that when $\gamma \geq \gamma_n$, for all $\rho > 0$:

$$Pr\left(\sup_{g_\varphi \in \hat{\mathcal{G}}(\rho)} \mathbb{E}_P\left[\frac{\delta(Y, f_\theta(X, Z))}{G(g_\varphi(X, Z))}\right] \leq c_1 \gamma \rho + \mathbb{E}_{P_n}\left[\frac{\delta(f_\theta; (X, Z, Y))}{q(O=1 \mid X, Z))}\right] + \varepsilon_n(\epsilon)\right) > 1 - \epsilon;$$

and when $\rho = p_n(f_\theta)$, for all $\gamma \geq 0$:

$$Pr\left(\sup_{g_\varphi \in \hat{\mathcal{G}}(\rho)} \mathbb{E}_P\left[\frac{\delta(Y, f_\theta(X, Z))}{G(g_\varphi(X, Z))}\right] \leq \sup_{P: W_c(P, P_n) \leq \tilde{\rho}} \mathbb{E}_P\left[\frac{\delta(f_\theta; (X, Z, Y))}{q(O=1 \mid X, Z))}\right] + \varepsilon_n(\epsilon)\right) > 1 - \epsilon,$$

where $\varepsilon_n(\epsilon) = \left(24\mathcal{J}(\tilde{\mathcal{F}}) + c_2\left(M, \sqrt{\log\frac{2}{\epsilon}}, \gamma\right)\right)/\sqrt{n}$ as suggested by Theorem 1.

The proof of Corollary 1 is provided as follows:

Proof. To obtain the first result, let the data-dependent $\gamma_n$ be given by $$\gamma_n = \max_i \sup_{h' \in \mathcal{H}} \left(\frac{\delta_{f_\theta}(h')}{q(h')} - \frac{\delta_{f_\theta}(h_i)}{q(h_i)}\right) / c(h_i, h').$$

Then according to the definition of $\Delta_\gamma$:

$$\mathbb{E}_{P_n} \Delta_{\gamma_n}(f_\theta; H) =$$

$$\frac{1}{N}\sum_i \sup_{h' \in \mathcal{X}} \left\{\frac{\delta_{f_\theta}(h')}{q(h')} - \max_j \sup_{h'' \in \mathcal{X}} \left\{\frac{\frac{\delta_{f_\theta}(h'')}{q(h'')} - \frac{\delta_{f_\theta}(h_j)}{q(h_j)}}{c(h_j, h'')}\right\} c(h_i, h')\right\}.$$

It is straightforward to verify that $$\mathbb{E}_{P_n} \Delta_{\gamma_n}(f_\theta; H) \leq \frac{1}{N}\sum_i \sup_{h'' \in \mathcal{X}} \left\{\frac{\delta_{f_\theta}(h')}{q(h')}\right\} + \frac{\delta_{f_\theta}(h_i)}{q(h_i)} - \sup_{h'' \in \mathcal{X}}\left\{\frac{\delta_{f_\theta}(h'')}{q(h'')}\right\} =$$

$$\frac{1}{N}\sum_i \frac{\delta_{f_\theta}(h_i)}{q(h_i)},$$

as well as $$\mathbb{E}_{P_n} \Delta_{\gamma_n}(f_\theta; H) \geq$$

$$\frac{1}{N}\sum_i \sup_{h' \in \mathcal{X}}\left\{\frac{\delta_{f_\theta}(h')}{q(h')}\right\} - \max_j \sup_{h'' \in \mathcal{X}}\left\{\frac{\frac{\delta_{f_\theta}(h'')}{q(h'')} - \frac{\delta_{f_\theta}(h_j)}{q(h_j)}}{c(h_j, h'')} c(h_i, h_j)\right\}$$

Which also equals to $$\frac{1}{N}\Sigma_i \sup_{h'' \in \mathcal{X}}\left\{\frac{\delta_{f_\theta}(h_i)}{q(h_i)}\right\}.$$

Therefore, when $\gamma = \gamma_n$, then $$\mathbb{E}_{P_n}[\Delta_{\gamma_n}(f_\theta; H)] = \mathbb{E}_{P_n}\left[\frac{\delta_{f_\theta}(H_i)}{q(H_i)}\right].$$

Similarly, it can be shown that when $\gamma = \gamma_n$, the above equality also holds. Hence, replace $\mathbb{E}_{P_n}[\Delta_{\gamma_n}(f_\theta; H)]$ with $$\mathbb{E}_{P_n}\left[\frac{\delta_{f_\theta}(H_i)}{q(H_i)}\right]$$

in Theorem 1 and obtain the first result.

To obtain the second result, define the transportation map:

$$T_\gamma(f_\theta; h) = \arg\max_{h'' \in \mathcal{X}}\left\{\frac{\delta_{f_\theta}(h')}{q(h')} - \gamma c(h, h')\right\}.$$

Then according to (A.8), the empirical maximizer for $\sup_{\hat{P}: W_c(\hat{P}, P^*) \leq \tilde{\rho}} \int \delta(y, f_\theta(x, z)) dP(h)$ is attained by $$\hat{P}(f_\theta) = \frac{1}{N}\sum_{i=1}^N I_{T_\gamma(f_\theta; h_i)}$$

where $I_h$ assign point mass at h, since it maximizes $$\int \sup_{h \in \mathcal{X}}\left(\frac{\delta_{f_\theta}(h)}{\hat{q}(h)} - \gamma c(h, h')\right) dQ_0(h').$$

Then let $\rho_n(f_\theta) = W_c(\hat{P}(f_\theta), P_n)$, which equals to $\mathbb{E}_{P_n}[c(T_\gamma(f_\theta; H), H]$ by definition. Now, $$c_1 \gamma \rho_n(f_\theta) + \mathbb{E}_{P_n}[\Delta_\gamma(f_\theta; H)] = \sup_{P: W_c(P, P_n) \leq \tilde{\rho}} \mathbb{E}_P[\delta(f_\theta; H)/q(H)],$$

for some $\tilde{\rho}$ that absorbs the excessive constant terms, which can be plugged it into Theorem 1 to obtain the second result for Corollary 1.

Corollary 1 shows that the approach described herein has the same $1/\sqrt{n}$ rate as the standard ERM. Also, the first result reveals an extra $\delta\rho$ bias term induced by the adversarial setting, the second result characterizes how the additional uncertainty is reflected on the propensity-weighted empirical loss.

Practical Implementation

Directly optimizing the minimax objective in (7) can be infeasible because $g^*$ is unknown and the Wasserstein distance is hard to compute when $\mathcal{G}$ is a complicated model such as neural network. Nevertheless, understanding the comparative roles of $f_\theta$ and $g_\varphi$ can help in constructing practical solutions.

Recall a goal of optimizing $f_\theta$. The auxiliary $g_\varphi$ is introduced to characterize the adversarial exposure mechanism, so there is less interest in recovering the true $g^*$. With that being said, the term $W_c(G(g_\varphi), G(g^*))$ serves to establish certain regularizations on such that it is constrained by the underlying exposure mechanism. Relaxing or tightening the regularization term should not significantly impact the solution because the regularization parameter $\alpha$ can be adjusted. Hence, tractable regularizers can be designed to approximate or even replace $W_c(G(g_\varphi), G(g^*))$, as long as the constraint on $g_\varphi$ is established under the same principle. Similar ideas have also been applied to train the generative adversarial network (GAN): the optimal classifier depends on the unknown data distribution, so in practice, people use alternative tractable classifiers that fit into the problem. Several alternative regularizers for $g_\varphi$ are listed below.

In the explicit feedback data setting, the exposure status is partially observed, so the loss of $G(g_\varphi)$ on the partially-observed exposure data can be used as the regularizer, i.e., $$\frac{1}{|D_{exp}|}\sum_{(u,i)\in D_{exp}} \phi(g_\varphi(x_u, z_i)), \text{ where } D_{exp} = \{(u,i)\in D \mid o_{u,i}=1\}.$$

For the content-based recommendations, the exposure often can have high correlation with popularity where the popular items are more likely to be recommended. So the regularizer may leverage the empirical popularity via:

$$corr\left(\frac{1}{m}\sum_u G(g_\varphi(X_u, Z_i)), \frac{1}{m}\sum_u Y_{u,i}\right).$$

In the implicit feedback setting, if all the other choices are impractical, simply use the loss on the feedback data as a regularizer: $\mathbb{E}_{P_n}[\ell(Y \cdot g_\varphi(X, Z))]$. The loss-based regularizer is meaningful because $g^*$ is often determined by some other recommendation models. If it happens that $g^* \in \mathcal{G}$, similar performances can be expected from $g_\varphi$ and $g^*$ on the same feedback data since the exposure mechanism is determined by $g^*$ itself.

The third example is focused on because it applies to almost all cases without requiring excessive assumptions. Therefore, the practical adversarial objective is now given by:

$$\underset{f_\theta \in \mathcal{F}}{\text{minimize}}\, \underset{g_\varphi \in \mathcal{G}}{sup}\, \mathbb{E}_{P_n}\left[\frac{\delta(Y, f_\theta(X, Z))}{G(g_\varphi(X, Z))}\right] - \alpha \mathbb{E}_{P_n}[\delta(Y, g_\varphi(X, Z))], \alpha \geq 0. \quad (8)$$

In the next step, it is considered how to handle the unobserved factors that also plays a part in the exposure mechanism. As mentioned above, having unobserved factors is inevitable practically. In particular, the Tukey's factorization used in the missing data approaches can be leveraged. In the presence of unobserved factors, Tukey's factorization suggests additionally characterizing the relationship between exposure mechanism and outcome.

For clarity, a simple logistic-regression to model G can be employed as:

$$G_\beta(g_\varphi(x,z),y) = \sigma(\beta_0 + \beta_1 g_\varphi(x,z) + \beta_2 y),$$

where $\sigma(\cdot)$ is the sigmoid function. The final form of the adversarial game can be expressed as follows:

$$\underset{f_\theta \in \mathcal{F}, \beta}{\text{minimize}}\, \underset{g_\varphi \in \mathcal{G}}{sup}\, \mathbb{E}_{P_n}\left[\frac{\delta(Y, f_\theta(X, Z))}{G_\beta(g_\varphi(X, Z), Y)}\right] - \alpha \mathbb{E}_{P_n}[\delta(Y, g_\varphi(X, Z))], \alpha \geq 0. \quad (9)$$

$\beta$ can be placed to the minimization problem for the following reason. By design, $G_\beta$ merely characterizes the potential impact of unobserved factors which is not considered to act adversarially. Otherwise, the adversarial model can be too strong for $f_\theta$ to learn anything useful.

Tukey's factorization can have implications on unobserved factors for exposure. Tukey's factorization can be used by the $G_\beta$ model to handle the unobserved factors in recommender system.

The following notation is used for counterfactual outcome: $Y_{u,i}(o)$, $o \in \{0,1\}$, which represents what the user feedback would be if the exposure $O_{u,i}$ were given by $o \in \{0,1\}$. In the factual world, observation can be limited to $Y_{u,i}$ for either $O_{u,i}=1$ or $O_{u,i}=0$, and the tuple $(Y_{u,i}(1), Y_{u,i}(0))$ is not jointly observed at the same time.

In the absence of unobserved factors, the joint distribution of $(Y_{u,i}(1), Y_{u,i}(0))$ has a straightforward formulation and can be estimated effectively from data using tools from causal inference. However, when unobserved factor exists, there are confounding between $(Y_{u,i}(1), Y_{u,i}(0))$, which violates a fundamental assumption of many causal inference solutions.

The Tukey's factorization, on the other hand, characterizes the missing data distribution regardless of the unobserved factors as:

$$p_\beta(Y(o), O \mid X, Z) = p(Y(o) \mid O = o, X, Z) \quad (A.16)$$

$$p(O = o \mid X, Z) \cdot \frac{p_\beta(O \mid Y(o)X, Z)}{p_\beta(O = o \mid Y(o), X, Z)}, o \in \{o, 1,\}$$

where $$\frac{p_\beta(O \mid Y(o)X, Z)}{p_\beta(O = o \mid Y(o)X, Z)}$$

concludes the unknown mechanism in the missing data distribution.

To see how the counterfactual outcome is reflected in the above formulation, when $O = \tilde{o} := 1 - o$ and $o = 1$:

$$p_\beta(Y(1), O = 0 \mid X, Z) =$$

$$p(Y(1) \mid O = 1, X, Z) p(O = 1 \mid X, Z) \cdot \frac{p_\beta(O = 0 \mid Y(1), X, Z)}{p_\beta(O = 1 \mid Y(1), X, Z)},$$

which gives the joint distribution of the outcome if the item was not exposed and the observed data where the item is exposed. Notice that both $p(Y(o)|O=o, X, Z)$ and $p(O=o|X, Z)$ can be estimated from the data, since $Y(o)$ is observed under $O=o$. So the unknown mechanism in the missing data distribution is:

$$p_\beta(O|Y(o),X,Z)/p_\beta(O=o|Y(o),X,Z).$$

Hence, the counterfactual outcome distribution can be given by:

$$p_\beta(Y(o)|O=1-o,X,Z) \propto p_{obs}(Y(o)|O=o,X,Z)/G_\beta(Y(o),X,Z) \quad o \in \{0,1\}, \qquad (A.17)$$

where $p_{obs}$ denotes the observable distribution and $$G_\beta(Y(o), X, Z) = \frac{p_\beta(O=o|Y(o), X, Z)}{p_\beta(O|Y(o), X, Z)}$$

characterizes the exposure mechanism even when unobserved factors exist.

The unknown $G_\beta(Y(o), X, Z)$ can be treated as a learnable objective in this setting. As discussed herein, $g_\psi$ can be used to characterize the role of X and Z in the exposure mechanism $G_\beta$, hence the formulation of $$\frac{\delta(Y, f_\theta(X, Z))}{G_\beta(Y, g_\psi(X, Z))}$$

in (9).

Including Y in modeling the exposure mechanism can cause the so-called self-selection problem in causal inference. This setting does not fall into that category, since the objective is to learn the $f_\theta$, rather than making inference on its treatment effect.

It is shown in the ablation studies that if the user feedback Y is not included, i.e., $G_\beta(Y, g_{104}(X, Z)) := \sigma(g_\psi(X, Z))$, the improvements over the original models will be less significant.

Minimax Optimization and Robust Evaluation

In a number of embodiments, to handle the adversarial training, the sequential optimization setup can be adopted in which the players take turn to update their model. Without loss of generality, the objective in (8) can be treated as a function of the two models: $\min_{f_\theta} \max_{g_\varphi} \ell(f_\theta g_{100})$. When $\ell$ is nonconvex-nonconcave, the classical Minimax Theorem no longer holds, and $\min_{f_\theta} \max_{g_\varphi} \ell(f_\theta g_\varphi) \neq \max_{g_\varphi} \min_{f_\theta} \ell(f_\theta g_\varphi)$. Consequently, which player goes first can have implications. Here, $f_\theta$ can be trained first because $g_\varphi$ can then choose the worst candidate from the uncertainty set in order to undermines $f_\theta$. The two-timescale gradient descent ascent (GDA) schema can be used, which can be applied to train adversarial objectives, as provided in Algorithm 1 below. However, the existing analysis on GDA's converging to local Nash equilibrium can assume simultaneous training, so their guarantees do not apply here. Instead, training can continue until the objective stops changing by updating either $f_\theta$ or $g_\varphi$ ---
Algorithm 1: Minimax optimization Input: Learning rates $r_\theta$, $r_\varphi$,
discounts $d_\theta$, $d_\varphi > 1$;
While loss not stabilized do
| $\theta = \theta - r_\theta \mathbb{E}_{batch} \nabla_\theta \ell(f_{\theta}, g_{\varphi})$;
| $\varphi = \varphi + r_\varphi \mathbb{E}_{batch} \nabla_\varphi \ell(f_{\theta}, g_{\varphi})$;
| $r_\theta = r_\theta/d_\theta, r_\varphi = r_\varphi/d_\varphi$;
end
---

Consequently, the stationary points in Algorithm 1 may not attain local Nash equilibrium. Nevertheless, when the timescale of the two models differ significantly (by adjusting the initial learning rates and discounts), it has been shown that the stationary points belong to the local minimax solution up to some degenerate cases. The local minimaxity captures the optimal strategies in the sequential game if both models are allowed to merely change their strategies locally. Hence, Algorithm 1 leads to solutions that are locally optimal. Finally, the role of $G_\beta$ is less relevant in the sequential game, and there are not observed significant differences from updating it before or after $f_\theta$ and $g_\varphi$.

Recommenders are often evaluated by the mean square error (MSE) on explicit feedback, and by the information retrieval metric such as DCG and NDCG on implicit feedback. After the training, the candidate model $f_\theta$, as well as the $G_\beta(g_\varphi)$ that gives the worst-case propensity score function specialized for $f_\theta$, can be obtained. Therefore, instead of pursuing unbiased evaluation, instead consider the robust evaluation by using $G_\beta(g_\varphi)$. It frees the offline evaluation from the potential impact of exposure mechanism, and thus provide a robust view on the true performance. For instance, the robust NDCG can be computed via:

$$\frac{1}{|\mathcal{D}_{test}|} \sum_{(u,i) \in \mathcal{D}_{test}} NDCG(y_{u,i}, f_\theta(x_u, z_i))/G_\beta(g_\varphi(x_u, z_i)).$$

Experiment and Result

Simulation studies, real-data analysis, as well as online experiments were conducted to demonstrate the various benefits of the adversarial counterfactual learning and evaluation approach described herein. In the simulation study, the synthetic data was generated using real-world explicit feedback dataset so that there is access to the oracle exposure mechanism. It is then shown that models trained by the techniques described herein achieve superior unbiased offline evaluation performances. In the real-world data analysis, it is demonstrated that the models trained by the techniques described herein also achieve more improvements even using the standard offline evaluation. Online experiments also were conducted, which verify that the robust evaluation described herein is more accurate than the standard offline evaluation when compared with the actual online evaluations.

The techniques described herein involve a high-level learning and evaluation approach that are compatible with most of the existing recommendation models, so these well-known baseline models were used to demonstrate the effectiveness of the described herein. Specifically, the popularity-based recommendation (Pop), matrix factorization collaborative filtering (CF), multi-layer perceptron-based CF model (MLP), neural CF (NCF) and the generalized matrix factorization (GMF), are employed as the representatives for the content-based recommendation. The prevailing attention-based model (Attn) also is considered as a representative for the sequential recommendation. Also $f_\theta$ and $g_\varphi$ are chosen among the above baselines models for this adversarial counterfactual learning. To fully demonstrate the effectiveness of the adversarial training described herein, there was also experimenting with the non-adversarially trained propensity-score method (PS), in which $g_\varphi$ is first optimized merely on the regularization term until convergence, keep it fixed, and then train $f_\theta$ in the regular propensity-weighted ERM setting. For the sake of notation, the learning approach described herein is listed as the ACL—(adversarial counterfactual learning).

The various methods were examined with the widely-adopted next-item recommendation task. In particular, all but the last two user-item interactions are used for training, the second-to-last interaction is used for validation, and the last interaction is used for testing. The data descriptions, preprocessing steps, train-validation-test split, simulation settings, detailed model configuration as well as the implementation procedure are now described. The training process is visualized that reveals the adversarial nature of the approach described herein. A complete set of ablation study and sensitivity analysis results are provided to demonstrate the robustness of this approach. The implementation and datasets have been made available at https://github.com/StatsDLMathsRecomSys/Adversarial-Counterfactual-Learning-and-Evaluation-for-Recommender-System.

Three real-world datasets are considered, which cover movie, book and music recommendations:

Movielens-1M. The benchmark dataset records users' ratings for movies, which includes around 1 millions ratings collected from 60,40 users on 3,952 movies. The rating is from 1 to 5, and a higher rating indicates more positive feedback. This dataset is available at http://files.grouplens.org/datasets/movielens/m1-1m.zip.

LastFM. The LastFM dataset is a benchmark dataset for music recommendation. For each of the 1,892 listeners, they tag the artists they may find fond of over time. Since the tag is a binary indicator, the LastFM is an implicit feedback dataset. There is a total of 186,479 tagging events, where 12,523 artists have been tagged. This dataset is available at http://files.grouplens.org/datasets/hetrec2011/hetrec2011-lastfm-2k.zip.

GoodReads. The benchmark book recommendation dataset is scraped from the users' public shelves on Goodread.com. The user review data on the history and biography sections is used due to their richness. There are in total 238,450 users, 302,346 unique books, and 2,066,193 ratings in these sections. The rating range is also from 1 to 5, a higher rating indicates more positive feedback. This dataset is available at https://sites.google.com/eng.ucsd.edu/ucsdbookgraph/home.

The Movielens-1M dataset has been filtered before being made available, where each user in the dataset has rated at least 20 movies. For the LastFM and Goodread datasets, infrequent items (books/artists) are first eliminated, as well as users that have fewer than 20 records. After examination, a small proportion of users are found to have an abnormal amount of interactions. Therefore, the users who have more than 1,000 interactions are treated as spam users and not included in the analysis.

The train-validation-test split is carried out based on the order of the user-item interactions. The standard setting is adopted, where for each user interaction sequence, all items but the last two are used in training, the second-to-last interaction is used in validation, and the last interaction is used in testing.

In a modern real-world recommender system, the exposure mechanism is determined by the underlying recommender model as well as various other factors. In an attempt to mimic the real-world recommender systems, a two-stage simulation approach is designed to generate the semi-synthetic data that remains truthful to the signal in the original dataset.

The purpose of the first stage is to learn the characteristic from the data, such as the user relevance (rating) model and the partial exposure model (which may be inaccurate due to the partial-observation of exposure status). In the second stage, the working method of a real-world recommender system is simulated, and the user response is generated accordingly. In order to recover the user-item relevance as accurate as possible, the explicit feedback dataset is used for the simulation, i.e., the Movielens-1M and Goodreads dataset.

In the first stage, given a true rating matrix, two hidden-factor matrix factorization models are trained. The first model tries to recover the rating matrix and by minimizing the mean-squared loss. This model is referred to as the relevance model. Since for the explicit feedback data, the rated items have all been exposed, so given the output $\hat{\mathbb{E}}[R_{u,i}|O_{u,i}=1]$, the relevance probability is defined as $$p_{sim1}(Y_{u,i}=1|O_{u,i}=1):=\sigma(\hat{\mathbb{E}}[R_{u,i}|O_{u,i}=1]+\epsilon_1),$$

where $\sigma(.)$ is the sigmoid function, and the Gaussian noise $\epsilon_1$ reflects the perturbations brought by unobserved factors. The second model is an implicit-feedback model trained to predict the occurrence of the rating event $\hat{p}(O_{u,i}=1)$, where instead of using the original ratings, the non-zero entries in the rating matrix are all converted to one.

After obtaining the $\hat{p}(O_{u,i}=1)$, the simulation exposure probability is defined as $\log p_{sim1}(O_{u,i}=1)=\log \hat{p}(O_{u,i}=1)+\epsilon_2$, where $\epsilon_2$ also gives the extra randomness due to the unobserved factors.

Now, after obtaining the simulated $p_{sim}(Y_{u,i}=1|O_{u,i}=1)$ and $p_{sim}(O_{u,i}=1)$, which reflects both the relevance and exposure underlies the real data generating mechanism while taking account of the effects from unobserved factors, the first-stage click data is generated based by:

$$p_{sim1}(Y_{u,i}=1)=p_{sim1}(Y_{u,i}=1|O_{u,i}=1)p_{sim1}(O_{u,i}=1).$$

So far, in the first stage, an implicit feedback dataset has been generated that remains truthful to the original real dataset. Now the self-defined components can be added, which gives more control over the exposure mechanism. Specifically, the new user and item hidden factors x, z are obtained by training another implicit matrix factorization model using the generated click data. The extra self-defined exposure function e(x, z) is generated and added to the first-stage $p_{sim1}$, to obtain the second-stage exposure mechanism:

$$\log p_{sim2}(O_{u,i}=1)=\log p_{sim1}(O_{u,i}=1)+e(x,z).$$

The final click data is then generated via:

$$p_{sim2}(Y_{u,i}=1)=p_{sim1}(Y_{u,i}=1|O_{u,i}=1)p_{sim2}(O_{u,i}=1).$$

Having the second stage in the simulation is beneficial, because the focus of the first stage is to mimic the generating mechanism of the real-world dataset. The second stage allows control of the exposure mechanism via the extra e(x, z). Also, retraining the implicit matrix factorization model in the beginning of the second stage is not required, thought it can help to better characterize the data generated in the first stage.

For the baseline models considered, other than Pop, the dimension of the user and item hidden factors, initial learning rate, and the $\ell_2$ regularization strength are the basic hyperparameters. The initial learning rate is selected from {0.001, 0.005, 0.01, 0.05, 0.1}, and the $\ell_2$ regularization strength from {0, 0.01, 0.05, 0.1, 0.2, 0.3}. The tuning parameters are selected separately to avoid excessive computations. The hidden dimension is fixed at 32 for the models in order to achieve fair comparisons in the experiments. Also, notice that this approach has approximately twice the number of parameters with respect to the corresponding baseline model. In practice, the hidden dimension can be treated as a hyperparameter as well. Sensitivity analysis can be provided on the hidden dimension later in this section, which can use the Hit@10 on validation data as the metric for selecting hyperparameters.

To check that the superior performance of this approach is not a consequence of higher model complexity, the hidden factor dimension of the baseline models is doubled to 64 when suitable.

Among the baseline models, the Pop, CF, GMF and Neural CF are all conventional approaches in recommender system that have relatively simpler structures, the default settings are adopted without describing their details. More described is provided for the attention-based sequential recommendation model Attn and the propensity-score method PS. For Attn, the model setting adopted has the self-attention mechanism added on top of an item embedding layer. The hidden dimension of the key, query and value matrices, and the number of dot-product attention heads are treated as the additional tuning parameters. For the PS method, there are two stages:

1. Obtain $g_\psi^*$ by minimizing $\mathbb{E}_{P_n}[\delta(Y, g_\psi(X,Z))]$ as a standard ERM;
2. Implement:

$$\underset{f_\theta \in \mathcal{F}, \beta}{\text{minimize}} \mathbb{E}_{P_n} \left[ \frac{\delta(Y, f_\theta(X, Z))}{G_\beta(g_\psi^*(X, Z))} \right],$$

as a propensity-weighted ERM.

The tuning parameters for $g_\psi$ and $f_\theta$ are selected in each stage separately.

The configurations for the approach includes two parts: the usual model configuration for $f_\theta$ and $g_\psi$, and the two-timescale train schema. Firstly, the tuning parameters selected for $f_\theta$ and $g_\psi$, when being trained alone also gives the near-optimal performance in the adversarial counterfactual training setting. Therefore, the hyperparameters (other than the learning rate) selected in their individual training for $f_\theta$ and $g_\psi$ are directly adopted. Experimenting is run on several settings for the two-timescale update to understand the impact of the relative magnitude of the initial learning rates $r_\theta$ and $r_\psi$. In practice, the learning rate discount is less relevant when using the Adam optimizer, since the learning rate is automatically adjusted. Intuitively speaking, the smaller the r (relative to $r_\theta$), the less $g_\psi$ is subject to the regularization in the beginning stage, and its adversarial behavior is less restricted. As a consequence, $f_\theta$ may not learn anything useful. Empirical evidence to support the above point is provided in FIG. 5, which illustrates plots 510, 520, 530, and 540, which show results from an adversarial training process on the Goodread synthetic data using ACL (GMF/GMF) in plots 510 and 530, and ACL (MLP/MLP) in plots 520 and 540. Plots 510 and 520 show the training objective for $f_\theta$ and $g_\psi$, i.e., $\mathbb{E}_{P_n}[\delta(Y, f_\theta(X, Z))/G_\beta(Y, g_\psi(X,Z))]$ and $\mathbb{E}_{P_n}[\delta(Y, g_\psi(X, Z))]$. Plots 530 and 540 show the evaluation metric on the validation dataset. Finally, the regularization parameter for the approach described herein is selected from {0.1, 1, 2}. The hyperparameters that are specific to the adversarial counterfactual training described herein are the initial learning rates $r_\theta$ and $r_\psi$, as well as the regularization parameter $\alpha$.

The models, including the matrix factorization models, are implemented with PyTorch on a Nvidia V100 GPU machine. The sparse Adam optimizer, available at https://agi.io/2019/02/28/optimization-using-adam-on-sparse-tensors/, is used to update the hidden factors, and the usual Adam optimizer is used to update the remaining parameters. Sparse Adam is used for the hidden factors because both the user and item factor are relatively sparse in recommendation datasets. The Adam algorithm leverages the momentum of the gradients from the previous training batch, which may not be accurate for the item and user factors in the current training batch. The sparse Adam optimizer is designed to solve the above issue for sparse tensors.

The early-stopping training method is used both for the baseline models, such that the training process is terminated when the validation metric stops improving for 10 consecutive epochs. And for this approach, the minimax objective value is monitored, and the training process is terminated if it stops changing for more than $\epsilon = 0.001$ after ten consecutive epochs.

It is straightforward to tell that in a single update step, the space and time complexity of this adversarial counterfactual training is exactly the summation for that of $f_\theta$ and $g_\psi$ (where the complexity induced by $G_\beta$ is almost negligible). In general, this approach may take more training epochs to converge depending on the $r_\theta/r_\psi$, in the two-timescale training schema.

Figure 5:
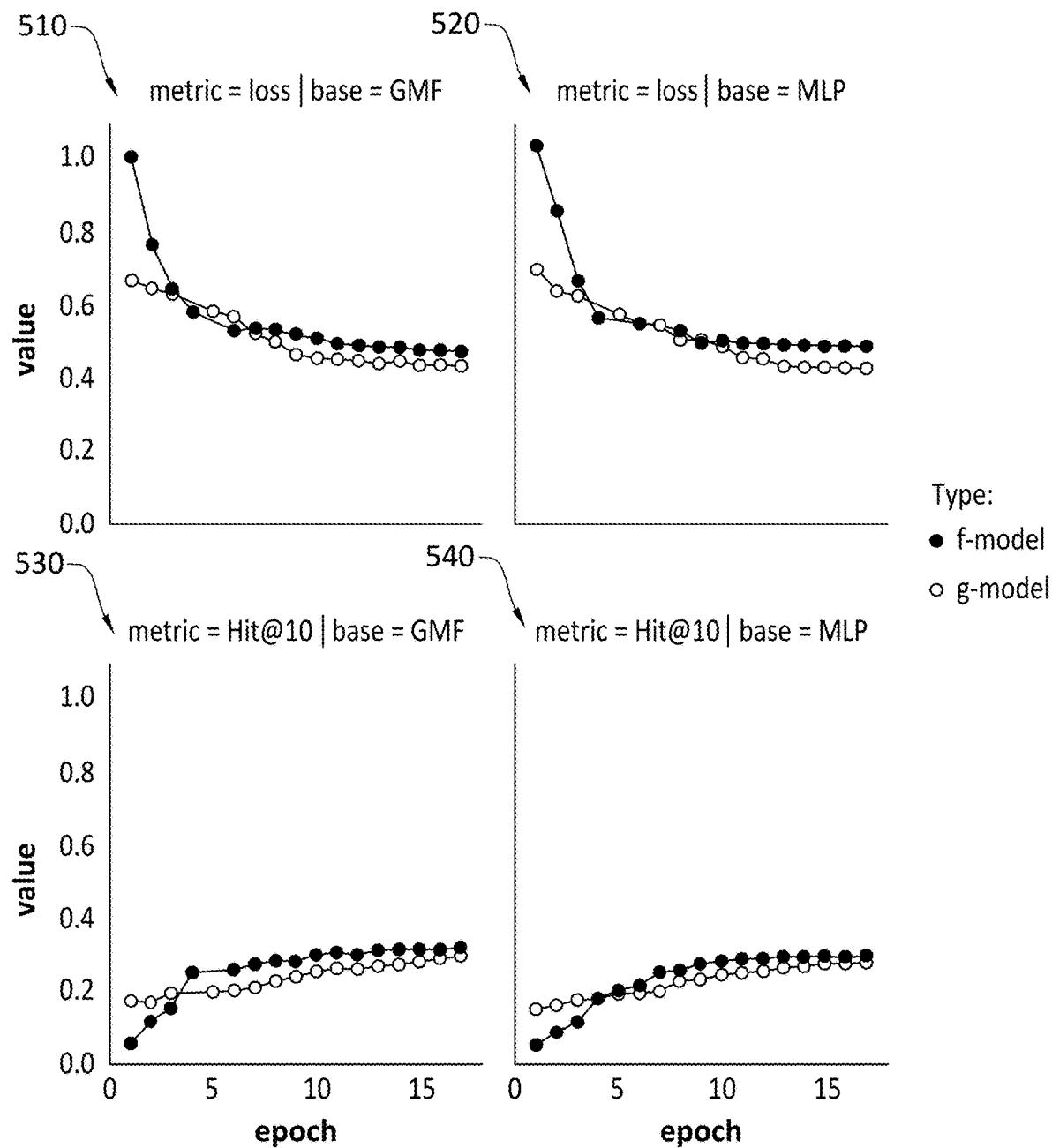
FIG. 5, which illustrates plots that show results from an adversarial training process on the Goodread synthetic data using adversarial counterfactual learning (ACL) (generalized matrix factorization (GMF)/GMF) and ACL (multi-layer perceptron (MLP)/MLP)
Figure 6:
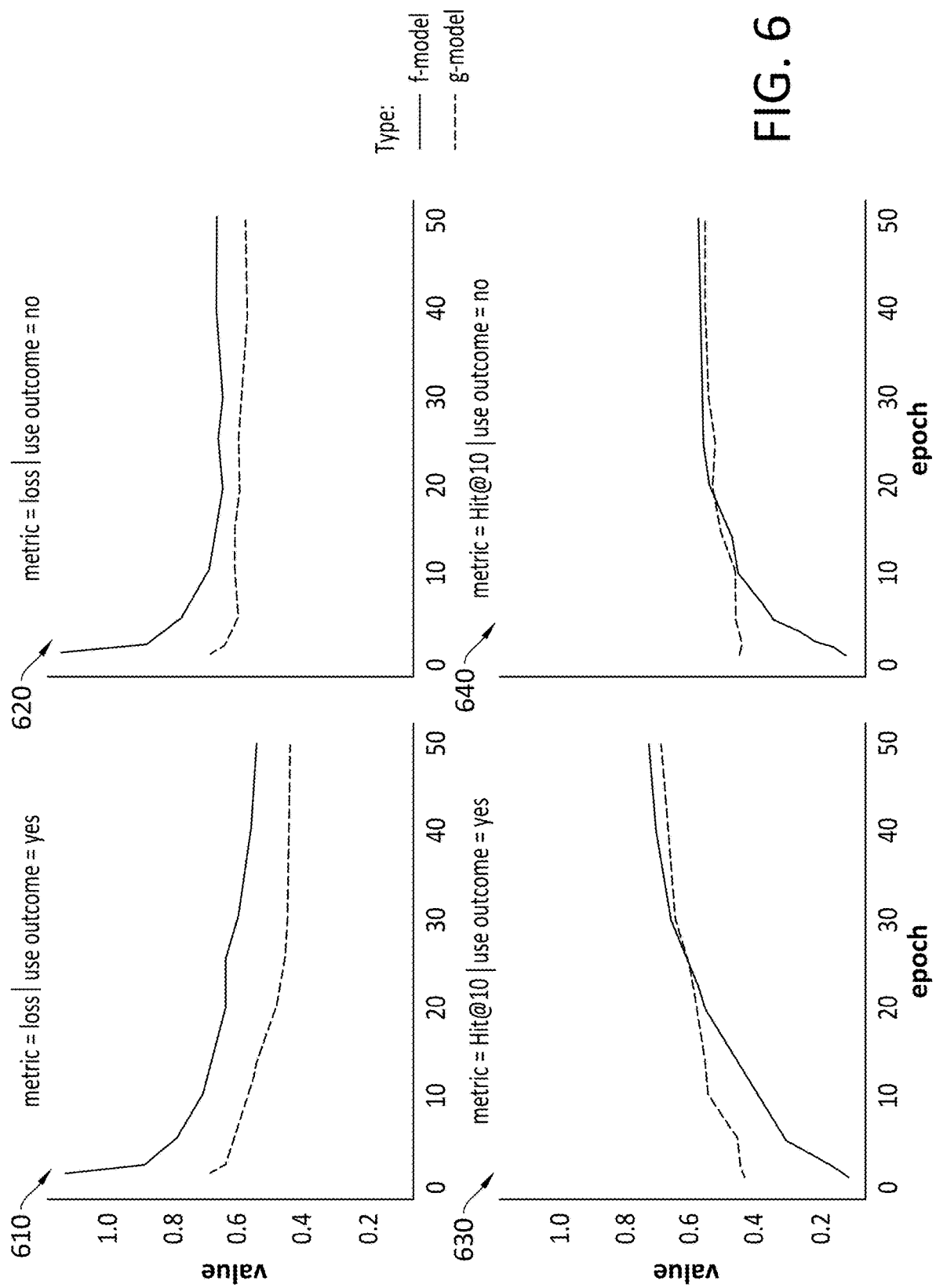
FIG. 6 illustrates plots that show results of an adversarial training process on the real Goodread data using ACL (attention-based model (Attn)/Attn) that results in the same pattern for the sequential recommendation setting, and demonstrates the effectiveness of including the outcomes for modeling the exposure mechanism.

To demonstrate the underlying adversarial training process of the adversarial counterfactual training method described herein, the training progress is plotted under several settings in FIG. 5 and FIG. 6. FIG. 6 illustrates plots 610, 620, 630 and 640, which show results of an adversarial training process on the real Goodread data using ACL (Attn/Attn) that results in the same pattern for the sequential recommendation setting, and demonstrates the effectiveness of including the outcomes into the $G_\beta$ for modeling the exposure mechanism. The "use outcome" indicates whether Y is used for modeling $G_\beta$.

From FIG. 5, the following can be observed:
- With a larger initial learning rate, $g_\psi$ tends to fit the data quicker than $f_\theta$.
- In the beginning stage, when $g_\psi$ has not yet fitted the data well, its adversarial behavior on $f_\theta$ is too strong, since both the loss value and the evaluation metric for $f_\theta$ is poor during that period. This also suggests the benefits of using a larger initial learning rate for $g_\theta$.
- As the training progresses, $f_\theta$ eventually catches up with and outperforms $g_\psi$ in terms on the evaluation metric. However, the loss objective for $f_\theta$ is still larger, which is reasonable since it has the extra adversarial term in $\mathbb{E}_{P_n}[\delta(Y, f_\theta(X, Z)/G_\beta(Y, g_\psi(X, Z))]$, which is controlled by $g_\psi$. This also implies that $g_\psi$ is acting adversarially throughout the whole process, which matches the design of the adversarial game.
- The training process gradually achieves the local minimax optimal, where both $f_\theta$ and $g_\psi$ are unable to undermine the performance of each other, and their individual performances improve at the same pace in the latter training phase.

The adversarial training on the real-world dataset using the sequential recommendation model ACL (Attn/Attn) in FIG. 6 is then examined. In plots 610 and 630 of FIG. 6, the same pattern as that of FIG. 5 can be observed, which suggests that the above discussions also apply to the real-world data and the sequential recommendation setting.

Further, a set of experiment were conducted in which the outcome is not included in modeling the exposure mechanism $G_\beta$, as shown in plots 620 and 640. First of all, it is observed that the same adversarial training patterns still hold whether or not the outcome is included in modeling $G_\beta$.

Secondly, the performances, both in terms of the loss value and evaluation metric, are less ideal when Y is not included in $G_\beta$.

A complete ablation study was performed. Firstly, the standard evaluations on the real-world data using the propensity score model are shown in table 1210 of FIG. 12 for the three real-world datasets. Table 1000 of FIG. 10 shows standard evaluations (with accounting for exposure) for the baselines and approach described herein on the benchmark data. Similarly, in the config rows are provided the $f_\theta$ and $g_\psi$ model choice when trained with the PS and the ACL approach. Also shown are the best $f_\theta$ and $g_\psi$ combination for the PS method, and the full results for the ACL approach. Compared with the results in table 1000 of FIG. 10, the results in table 1210 of FIG. 12 show that the adversarial counterfactual training approach still outperforms their propensity-score counterparts, which again emphasizes the benefits of having the adversarial process between $f_\theta$ and $g_\psi$. Secondly, table 1220 of FIG. 12 show the standard evaluations for the baseline models trained with the adversarial counterfactual approach (ACL base model) on the real-world dataset. Models trained with the ACL approach uniformly outperform their counterparts. Notice that the superior performances of the ACL approach do not benefit from a larger model complexity, since the hidden factor dimension of the corresponding baseline models was doubled, such that the number of parameters are approximately the same for all models.

Figure 7:
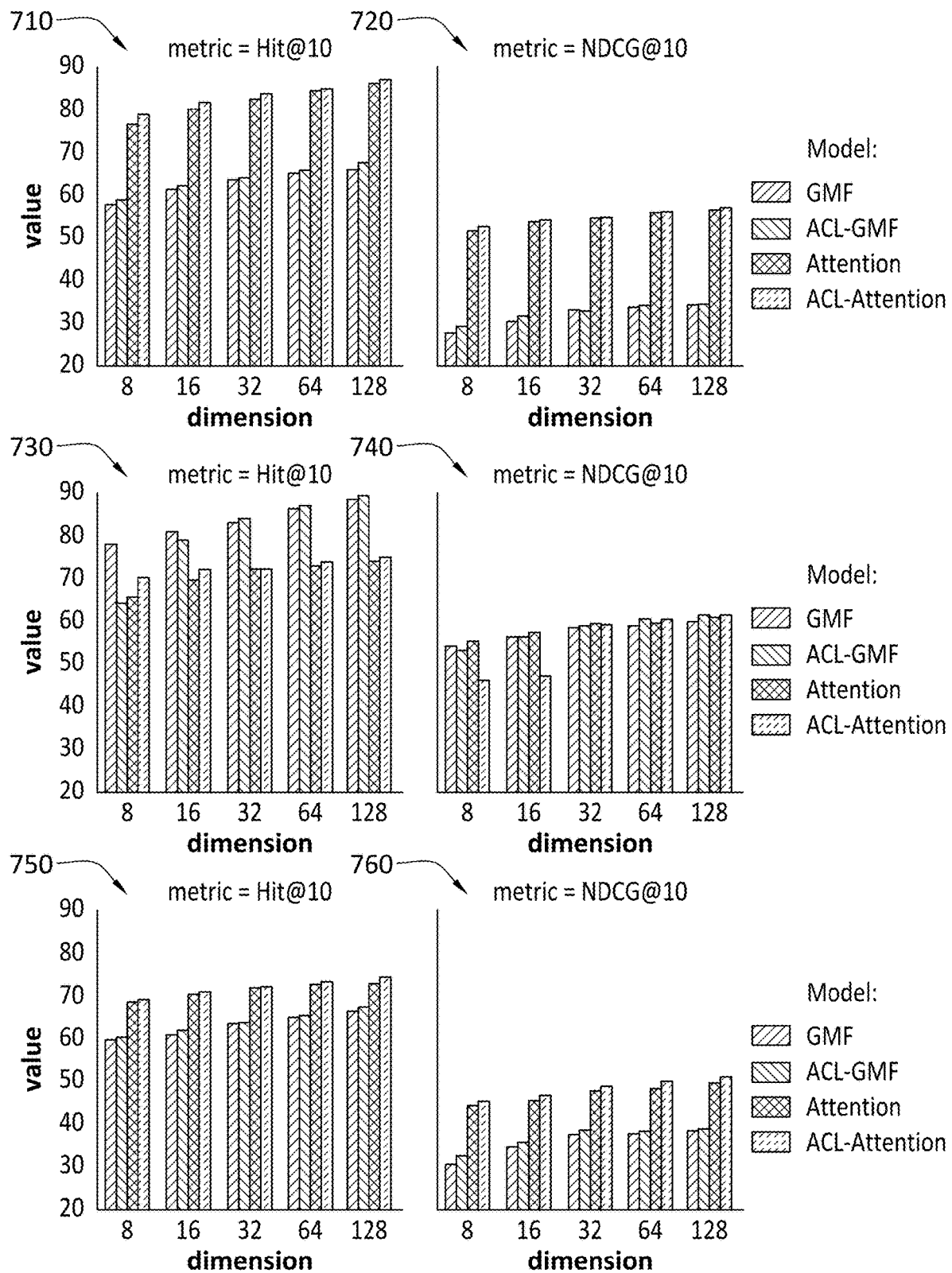
FIG. 7 illustrates graphs showing results of sensitivity analysis of hidden factor dimension for the content-based ACL (GMF/GMF) model and the sequential ACL (Attn/Attn) model together with their corresponding baseline models, on the three real-world datasets.

Sensitivity analysis is provided for the adversarial counterfactual approach, focusing mostly on the user/item hidden factor dimension size and the regularization parameter $\alpha$. The results of on the real-world datasets. FIG. 7 illustrates graphs 710, 720, 730, 740, 750, and 760, showing results of sensitivity analysis of hidden factor dimension for the content-based ACL (GMF/GMF) model and the sequential ACL (Attn/Attn) model together with their corresponding baseline models, on the three real-world datasets. The hidden dimensions for the corresponding baselines are doubled from what is shown in the plots to achieve fair comparisons. From the top to bottom are results for the Movielens-1M data in graphs 710 and 720, LastFM data in graphs 730 and 740, and Goodread.com data in graphs 750 and 760. The sensitivity analysis on user/item hidden factor dimension size is shown in FIG. 7, showing that the larger dimensions most often lead to better outcome (within the range considered), which is in accordance with the common consensus in the recommender system domain. This also suggests that the ACL approach inherits some of the properties from the $f_\theta$ and $g_\psi$, so the model understanding diagnostics also become easier if $f_\theta$ and $g_\psi$ are well-studied.

Figure 8:
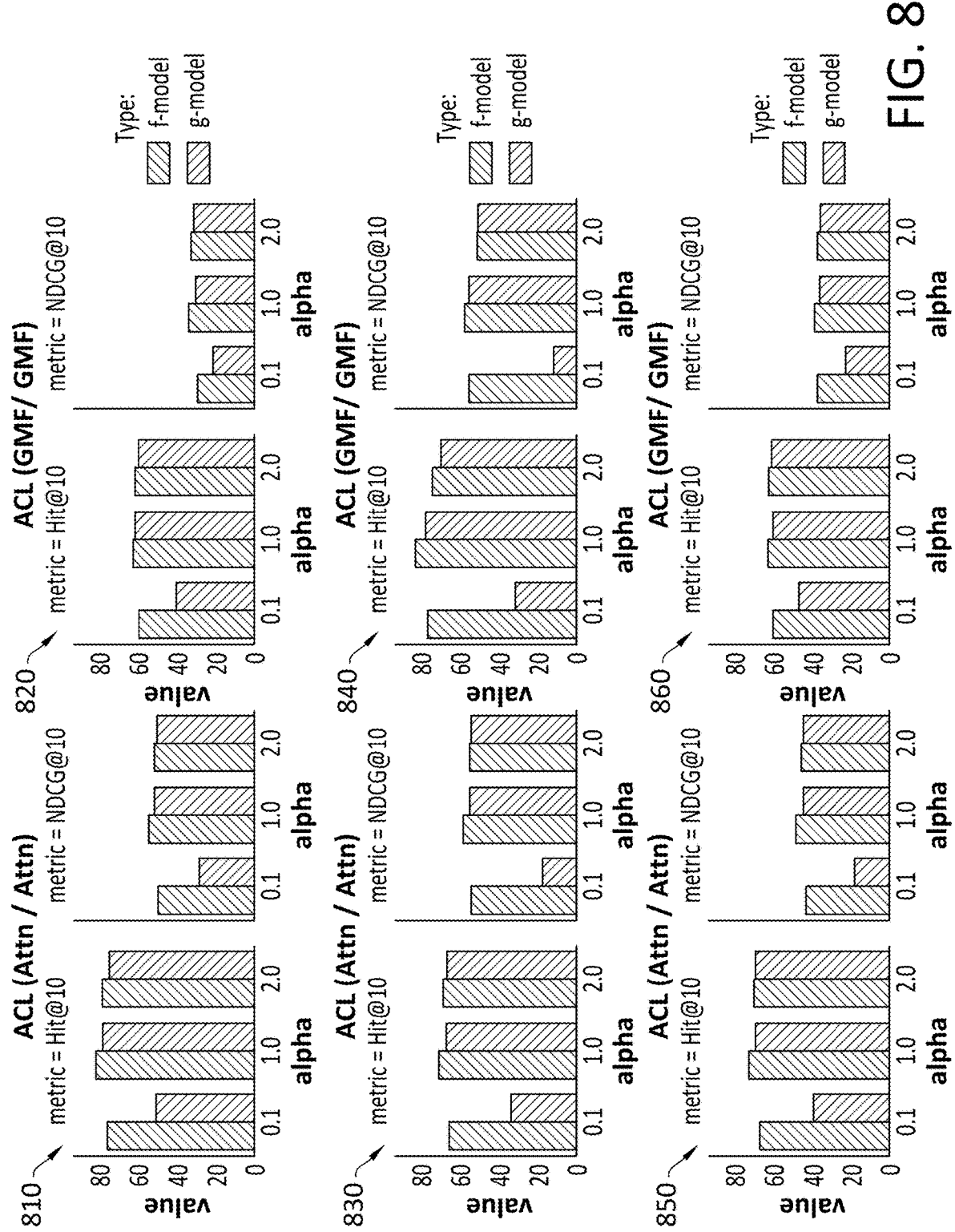
FIG. 8 illustrates graphs showing results of sensitivity analysis on the regularization parameter $\alpha$ for the content-based ACL (GMF/GMF) model and the sequential ACL (Attn/Attn) model for their $f_\theta$ and $g_\psi$ components, on the three real-world datasets.

The sensitivity analysis on the regularization parameter is provided in FIG. 8. FIG. 8 illustrates graphs 810, 820, 830, 840, 850, and 860, showing results of sensitivity analysis on the regularization parameter $\alpha$ for the content-based ACL (GMF/GMF) model and the sequential ACL (Attn/Attn) model for their $f_\theta$ and $g_\psi$ components, on the three real-world datasets. From the top to bottom, are results for the Movielens-1M data in graphs 810 and 820, LastFM data in graphs 830 and 840, and Goodread.com data in graphs 850 and 860. The experiment was not performed on a wide range of $\alpha$; however, the results at hand already show the patterns, which indicate that the ACL approach achieves the best performances when $\alpha$ is neither too big nor too small. In terms of this context, when $\alpha$ is too small, the regularization on $g_\psi$ becomes relatively weak compared with the loss objective of $f_\theta$, so g does not fit the data well. As a consequence, $f_\theta$ also suffers from the under-fitting issues of $g_\psi$. On the other hand, when $\alpha$ gets too large, the minimax game will focus more on fitting $g_\psi$ to the data and overlooks $f_\theta$.

Additionally, the online experiments provide valuable evaluation results that reveal the appeal of the ACL approach for real-world applications. All the online experiments were conducted for a content-based item page recommendation module, under the implicit feedback setting where the users click or not click the recommendations. A list of ten items is shown to the customer on each item page, e.g., items that are similar or complementary to the anchor item on that page. The recommendation is personalized, so the user identification (ID) and user features are included in the model as well.

In each iteration of model deployment, the new item features and user features are added into the previous model. The architecture of the recommendation model generally remains unchanged during the iterations, which makes it favorable for examining the ACL approach. There have been four online experiments (A/B testing) conducted for a total of eight models that are trained offline using the adversarial counterfactual training described herein, and then evaluated using the history implicit feedback data. Unobserved factors such as the real-time user features, page layout and same-page advertisements are continually changing and are thus not included in the analysis. The metric that is used to compare the different offline evaluation methods with online evaluation is the click-through rate.

For synthetic data analysis, the explicit feedback data from MovieLens-1M and Goodreads datasets were used. A baseline CF model was trained and the optimized hidden factors are used to generate a synthetic exposure mechanism, which was treated as the oracle exposure. The implicit feedback data was then generated according to the oracle exposure as well as the optimized hidden factors. Unbiased offline evaluation was possible because of access to the exposure mechanism. Also, to set a reasonable benchmark under the simulation setting, additional experiments were provided in which $g_\varphi$ is given by the oracle exposure model. The results are provided in FIG. 9, which provides unbiased evaluations (using the true exposure) for the baselines and the ACL approach on the semi-synthetic data. Table 910 of FIG. 9 show in the config rows the $g_\varphi$ model (such as using the baseline models and the oracle model) when trained with the propensity-score (PS) approach or the approach described herein (marked by the ACL-). Table 920 shows the original baseline models without using propensity-score approach or ACL. Bold-font and underscore is used to mark the best and second-best outcomes. The mean and standard deviation are computed over ten repetitions. When trained with the approach described herein, the baselines models yield their best performances (other than the oracle-enhanced counterparts) under the unbiased offline evaluation, and outperforms the rest of the baselines, which reveals the first appeal of the ACL approach.

For real data analysis, other than using the MovieLens-1M and Goodreads data in the implicit feedback setting, the LastFM music recommendation (implicit feedback) dataset is further included. The results in table 1000 of FIG. 10 show that the models trained by the ACL approach achieve the best outcome, even using the standard evaluation where the exposure mechanism is not considered. The better performance in standard evaluation suggests the second appeal of the adversarial counterfactual learning, that even though it optimizes towards the minimax setting, the robustness is not at the cost of the performance under the standard evaluation.

For online experiment analysis, to examine the practical benefits of the robust learning and evaluation approach described herein in real-world experiments, several online A/B testing scenarios were carried out on Walmart.com, a major e-commerce platform in the U.S., in a content-based item recommendation setting, with access to the actual online testing and evaluation results. All the candidate models were trained offline using the approach described herein. The standard offline evaluation, popularity-debiased offline evaluation (where the item popularity is used as the propensity score), the propensity-score model approach, and the robust evaluation described herein were compared with respect to the actual online evaluations. Table 1100 of FIG. 11 shows results of the mean-squared error (MSE) to online evaluation results from eight online experiments. Table 1100 of FIG. 11 shows that the evaluation approach described herein is indeed a more robust approximation to online evaluation. It reveals a third appeal of the approaches described herein, that they are capable of narrowing the gap between online and offline evaluations.

In many embodiments, the techniques described herein can improve on the drawback of supervised learning for recommender systems, by using a theoretically-grounded adversarial counterfactual learning and evaluation framework. The theoretical and empirical results illustrate the benefits of the techniques described herein.

Exemplary System and Method

Figure 13:
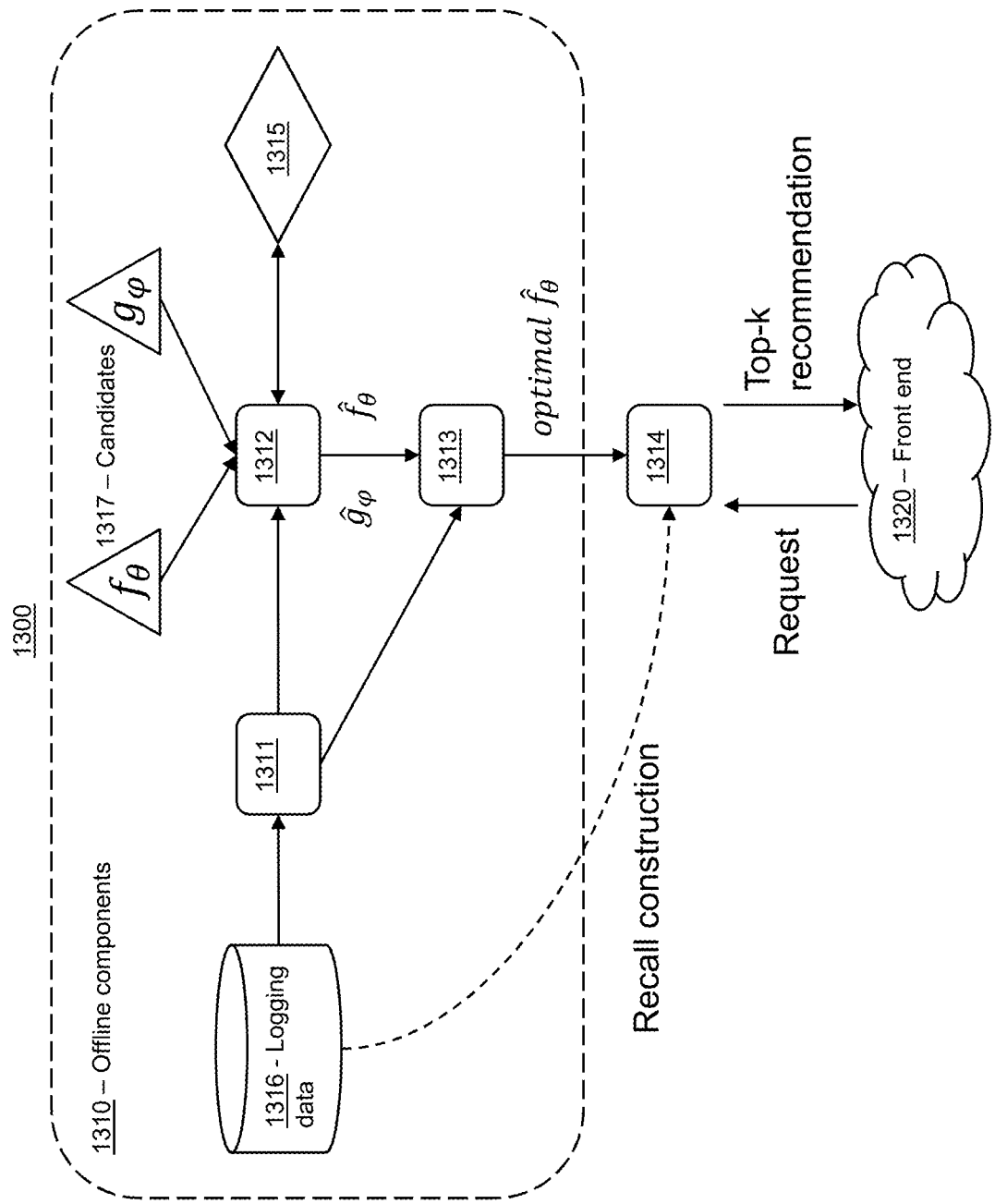
FIG. 13 illustrates a block diagram of a system 1300 that can be employed for generating recommendations using adversarial counterfactual learning and evaluation, according to another embodiment.

Turning ahead in the drawings, FIG. 13 illustrates a block diagram of a system 1300 that can be employed for generating recommendations using adversarial counterfactual learning and evaluation, according to an embodiment. System 1300 is merely exemplary and embodiments of the system are not limited to the embodiments presented herein. The system can be employed in many different embodiments or examples not specifically depicted or described herein. In some embodiments, certain elements, modules, or systems of system 1300 can perform various procedures, processes, and/or activities. In other embodiments, the procedures, processes, and/or activities can be performed by other suitable elements, modules, or systems of system 1300. System 1300 can be similar to system 300 (FIG. 3), and various components of system 1300 can be similar or identical to system 300 (FIG. 3).

Generally, therefore, system 1300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 1300 described herein. System 1300 can be a computer system, such as computer system 100 (FIG. 1), as described above, and can each be a single computer, a single server, or a cluster or collection of computers or servers, or a cloud of computers or servers. In another embodiment, a single computer system can host system 1300.

In some embodiments, system 1300 can include offline components 1310, such as a data component 1311, a training component 1312, and/or an evaluation component 1313, which can be in data communication with a database 1316 that includes logging data, and can use an algorithm 1315 and/or candidates 1317, such as $f_\theta$ and $g_\varphi$. System 1300 also can include an online ranking and serving component 1314, which can receive a requests from a front-end component 1320 for recommendations, and can return recommendations to front-end component 1320. Data component 1311 and/or training component 1312 can be similar or identical to training system 312 (FIG. 3). Evaluation component 1313 can be similar or identical to evaluation component 313 (FIG. 3). Online ranking and service component 1314 can be similar or identical to real-time serving system 314 (FIG. 3). Database 1316 can be similar or identical to database 315 (FIG. 3). Front end component 1320 can be similar or identical to web server 320 (FIG. 3).

In many embodiments, data component 1311 can receive raw logging data, such as historical user session data, from database 1316 to prepare training and evaluation data, such as personalized recommendation data and/or item recommendation data. In some embodiments, personalized recommendation data can include, for each data record, a user feature, a view sequence, an item feature, a target purchase, a label, and/or other suitable information. In various embodiments, item recommendation data can include, for each data records, an anchor item, a candidate item, an item feature, a label, and/or other suitable information. In many embodiments, the data can be used by training component 1312 and/or evaluation component 1313. In many embodiments, the label can be positive or negative, which can indicate whether the customer clicked on the item or not. The personalized recommendation data can be personalized to each user, and the item recommendation data can be generalized and not personalized to each user. The training data can provide the type of recommendation to be provided, such as recommendations for similar items or complementary items.

In a number of embodiments, training component 1312 can receive candidates 1317, which can be any candidate recommendation algorithm $f_\theta$ and an adversarial exposure model $g_\varphi$. In many embodiments, multiple candidate recommendation algorithms $f_\theta$ can be received, such as for multiple different families of machine learning, such as linear regression, neural network, matrix factorization, etc. In several embodiments, training component 1312 can train candidate recommendation algorithms $f_\theta$ and an adversarial exposure model $g_\varphi$ using data obtained from data component 1311 and algorithm 1315 to generate optimized candidate recommendation algorithms $\hat{f}_\theta$ and the "most adversarial" exposure model $\hat{g}_\varphi$. In many embodiments, algorithm 1315 can be a gradient ascent descent, as described above in Algorithm 1, used to optimize the minimax objective, such as the objective function described above in Equation 9.

In a number of embodiments, evaluation component 1313 can perform a robust offline evaluation using the most adversarial exposure model $\hat{g}_\varphi$ to evaluate the optimized candidate recommendation algorithms $\hat{f}_\theta$ on the evaluation data obtained from data component 1311, and select the best of the optimized candidate recommendation algorithms $\hat{f}_\theta$, which can be denoted the optimal $\hat{f}_\theta$.

In several embodiments, the optimal $\hat{f}_\theta$ can be fed to online ranking and service component 1314. In several embodiments, a recall set can be constructed, based on logging data in database 1316 to find a subset of candidate item pairs that are more likely to contain the optimal choice, as the full set of candidate item pairs can be too large for applying the model to all candidate item pairs. In several embodiments, the optimal $\hat{f}_\theta$ can be used to rank the candidate items in the recall set, and the top-K recommendations can be fed to front end component 1320, such as upon request from front-end component.

Figure 14:
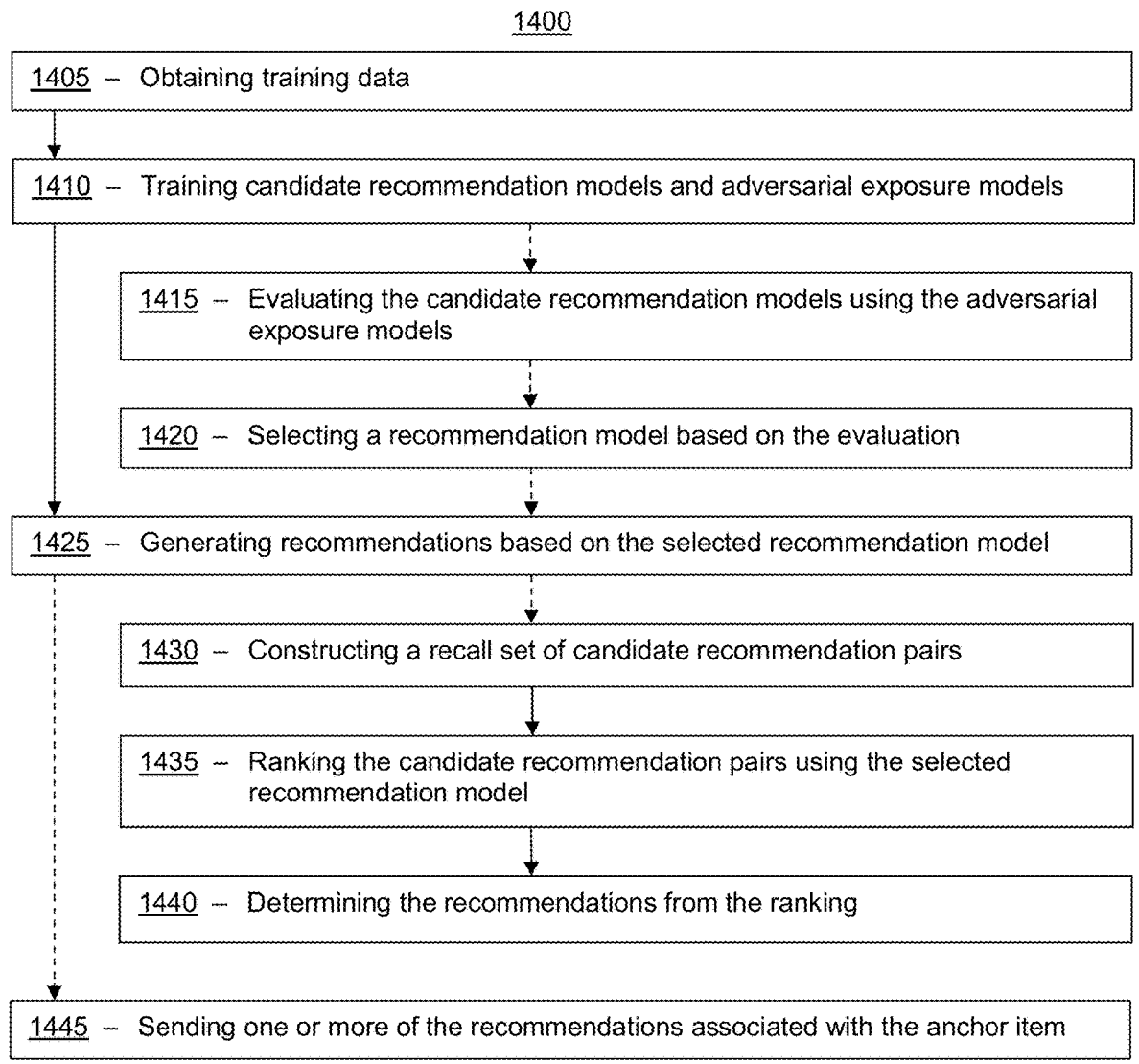
FIG. 14 illustrates a flow chart for a method 1400 of generating recommendations using adversarial counterfactual learning and evaluation, according to another embodiment.

Turning ahead in the drawings, FIG. 14 illustrates a flow chart for a method 1400 of generating recommendations using adversarial counterfactual learning and evaluation, according to an embodiment. Method 1400 is merely exemplary and is not limited to the embodiments presented herein. Method 1400 can be employed in many different embodiments or examples not specifically depicted or described herein. In some embodiments, the procedures, the processes, and/or the activities of method 1400 can be performed in the order presented. In other embodiments, the procedures, the processes, and/or the activities of method 1400 can be performed in any suitable order. In still other embodiments, one or more of the procedures, the processes, and/or the activities of method 1400 can be combined or skipped.

In many embodiments, system 300 (FIG. 3), recommendation system 310 (FIG. 3), web server 320 (FIG. 3), and/or system 1300 (FIG. 13) can be suitable to perform method 1400 and/or one or more of the activities of method 1400. In these or other embodiments, one or more of the activities of method 1400 can be implemented as one or more computing instructions configured to run at one or more processors and configured to be stored at one or more non-transitory computer readable media. Such non-transitory computer readable media can be part of system 300 (FIG. 3) and/or system 1300 (FIG. 3). The processor(s) can be similar or identical to the processor(s) described above with respect to computer system 100 (FIG. 1).

In some embodiments, method 1400 and other activities in method 1400 can include using a distributed network including distributed memory architecture to perform the associated activity. This distributed architecture can reduce the impact on the network and system resources to reduce congestion in bottlenecks while still allowing data to be accessible from a central location.

Referring to FIG. 14, method 1400 can include an activity 1405 of obtaining training data. In many embodiments, the training data can be generated from logging data, such as historical user session data. In a number of embodiments, the training data can include personalized recommendation data and/or item recommendation data. In some embodiments, the personalized recommendation data can include first records each including a respective user feature, a respective view sequence, a respective item feature, a respective target purchase, and a respective label. In various embodiments, the item recommendation data can include second records each including a respective anchor item, a respective candidate item, a respective item feature, and a respective label. In a number of embodiments, activity 1405 can be performed at least in part by communication system 311 (FIG. 3), training system 312 (FIG. 3), and/or data component 1311 (FIG. 13).

In a number of embodiments, method 1400 also can include an activity 1410 of training candidate recommendation models and an adversarial exposure model using the training data. The candidate recommendation models can be similar or identical to candidate recommendation algorithms $f_\theta$ described above.

The adversarial exposure model can be similar or identical to adversarial exposure model $g_\varphi$ described above. In a number of embodiments, the candidate recommendation models can include a linear regression recommendation model, a neural network recommendation model, and/or a matrix factorization recommendation model, or other suitable recommendation models. In several embodiments, activity 1410 can include performing a gradient ascent descent to optimize a minimax objective for each of the candidate recommendation models and the adversarial exposure model. The gradient ascent descent can be similar or identical to Algorithm 1 described above. The minimax objective can be similar or identical to the objective functions described above, such as Equation 9. In many embodiments, activity 1410 can train the candidate recommendation algorithms $f_\theta$ to generate optimized candidate recommendation algorithms $\hat{f}_\theta$, and/or can train the adversarial exposure model $g_\varphi$ to generate the "most adversarial" exposure model $\hat{g}_\varphi$. In a number of embodiments, activity 1410 can be performed at least in part by training system 312 (FIG. 3) and/or training component 1312 (FIG. 13).

In several embodiments, method 1400 additionally and optionally can include an activity 1415 of performing an evaluation of the candidate recommendation models, as trained, using the adversarial exposure model, as trained. For example, the "most adversarial" exposure model $\hat{g}_\varphi$ can be used to evaluate the optimized candidate recommendation algorithms $\hat{f}_\theta$. In a number of embodiments, activity 1415 can be performed at least in part by evaluation system 313 (FIG. 3) and/or evaluation component 1313 (FIG. 13).

In a number of embodiments, method 1400 further and optionally can include an activity 1420 of selecting the selected recommendation model from among the candidate recommendation models based on the evaluation. For example, the evaluation can be used to determine the optimal $\hat{f}_\theta$, which can be the best performing model of the optimized candidate recommendation algorithms $\hat{f}_\theta$. In a number of embodiments, activity 1420 can be performed at least in part by evaluation system 313 (FIG. 3), and/or evaluation component 1313 (FIG. 13).

In several embodiments, method 1400 additionally can include an activity 1425 of generating recommendations based on a selected recommendation model of the candidate recommendation models. In a number of embodiments, activity 1420 can be performed at least in part by real-time serving system 314 (FIG. 3) and/or evaluation component 1313 (FIG. 13).

In a number of embodiments, activity 1425 can include an activity 1430 of constructing a recall set of candidate recommendation pairs.

In several embodiments, activity 1425 also can include an activity 1435 of generating a ranking of the candidate recommendation pairs in the recall set using the selected recommendation model. For example, the optimal $\hat{f}_\theta$ can be used to rank the candidate items in the recall set.

In a number of embodiments, activity 1425 additionally can include an activity 1440 of determining the recommendations from the ranking. For example, a top-K rankings can be used as the recommendation.

In several embodiments, method 1400 additionally and optionally can include an activity 1445 of, when a user requests to view an anchor item, sending one or more of the recommendations associated with the anchor item to be displayed to the user. In many embodiments, the one or more recommendations can be one or more of the recommendations in the top-K rankings determined in activity 1440. In a number of embodiments, activity 1420 can be performed at least in part by communication system 311 (FIG. 3), real-time serving system 314 (FIG. 3), and/or online ranking and service component 1314 (FIG. 13).

In many embodiments, the techniques described herein can provide a practical application and several technological improvements. In some embodiments, the techniques described herein can provide for generating recommendations using adversarial counterfactual learning and evaluation. These techniques described herein can provide a significant improvement over conventional approaches that fail to account for the underlying exposure mechanism.

In a number of embodiments, the techniques described herein can solve a technical problem that arises only within the realm of computer networks, as online ordering is a concept that do not exist outside the realm of computer networks. Moreover, the techniques described herein can solve a technical problem that cannot be solved outside the context of computer networks. Specifically, the techniques described herein cannot be used outside the context of computer networks, in view of a lack of data, and the inability to train the machine-learning recommendation models without a computer.

Various embodiments can include a system including one or more processors and one or more non-transitory computer-readable media storing computing instructions that, when executed on the one or more processors, perform certain acts. The acts can include obtaining training data. The acts also can include training candidate recommendation models and an adversarial exposure model using the training data. The acts additionally can include generating recommendations based on a selected recommendation model of the candidate recommendation models.

A number of embodiments can include a method being implemented via execution of computing instructions configured to run at one or more processors. The method can include obtaining training data. The method also can include training candidate recommendation models and an adversarial exposure model using the training data. The method additionally can include generating recommendations based on a selected recommendation model of the candidate recommendation models Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

Although generating recommendations using adversarial counterfactual learning and evaluation has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-14 may be modified, and that the foregoing discussion of certain of these embodiments does not necessarily represent a complete description of all possible embodiments. For example, one or more of the procedures, processes, or activities of FIG. 14 may include different procedures, processes, and/or activities and be performed by many different modules, in many different orders. As another example, the systems within system 300 (FIG. 3) and/or system 1300 (FIG. 13) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to:
generate first-stage click data by mimicking a generating mechanism of a real-world dataset;
obtain training data based on the first-stage click data and based on controlling an exposure mechanism in a second stage;
generate optimized machine learning models and a most adversarial exposure model by training a plurality of candidate recommendation models and an adversarial exposure model using the training data after obtaining the training data based on the first-stage click data and based on controlling the exposure mechanism in the second stage,
wherein the plurality of candidate recommendation models comprises multiple different families of machine learning models,
wherein training the adversarial exposure model comprises using sequential optimization, with two-timescale gradient ascent descent schema to optimize a minimax objective for the adversarial exposure model, by taking turns with model updating, and
wherein training the adversarial exposure model terminates when a validation metric changes less than a predetermined threshold after a predetermined number of consecutive epochs;
select, from the optimized machine learning models, a best optimized machine learning model by using the most adversarial exposure model to evaluate the optimized machine learning models on evaluation data; and
generate, based on receiving a request from a front-end component, recommendations by using the best optimized machine learning model.

2. The system of claim 1, wherein the training data comprise personalized recommendation data and item recommendation data.

3. The system of claim 2, wherein the personalized recommendation data comprise first records each comprising a respective user feature, a respective view sequence, a respective item feature, a respective target purchase, and a respective label.

4. The system of claim 2, wherein the item recommendation data comprise second records each comprising a respective anchor item, a respective candidate item, a respective item feature, and a respective label.

5. The system of claim 1, wherein the plurality of candidate recommendation models comprise a linear regression recommendation model, a neural network recommendation model, and a matrix factorization recommendation model.

6. The system of claim 5, wherein training the plurality of candidate recommendation models and the adversarial exposure model further comprises:
performing the two-timescale gradient ascent descent to optimize the minimax objective for each of the plurality of candidate recommendation models.

7. The system of claim 1, wherein, to select the best optimized machine learning model, the one or more processors are to:
perform an evaluation of the plurality of candidate recommendation models, as trained, using the adversarial exposure model, as trained.

8. The system of claim 1, wherein, to generate the recommendations, the one or more processors are to:
construct a recall set of candidate recommendation pairs;
generate a ranking of candidate recommendation pairs in the recall set using the best optimized machine learning model; and
determine the recommendations based on the ranking.

9. The system of claim 1, wherein the one or more processors are further to:
when a user requests to view an anchor item, sending one or more of the recommendations to be displayed to the user.

10. A method implemented via execution of computing instructions configured to run at one or more processors, the method comprising:
generating first-stage click data by mimicking a generating mechanism of a real-world dataset;
obtaining training data based on the first-stage click data and based on controlling an exposure mechanism;
generating optimized machine learning models and a most adversarial exposure model by training a plurality of candidate recommendation models and an adversarial exposure model using the training data after obtaining the training data based on the first-stage click data and based on controlling the exposure mechanism,
wherein the plurality of candidate recommendation models comprises multiple different families of machine learning models,
wherein training the adversarial exposure model comprises using sequential optimization, with two-timescale gradient ascent descent schema to optimize a minimax objective for the adversarial exposure model, by taking turns with model updating, and
wherein training the adversarial exposure model terminates when a validation metric changes less than a predetermined threshold after a predetermined number of consecutive epochs;
selecting, from the optimized machine learning models, a best optimized machine learning model by using the most adversarial exposure model to evaluate the optimized machine learning models on evaluation data; and
generating, based on receiving a request from a front-end component, recommendations by using the best optimized machine learning model.

11. The method of claim 10, wherein the training data comprise personalized recommendation data and item recommendation data.

12. The method of claim 11, wherein the personalized recommendation data comprise first records each comprising a respective user feature, a respective view sequence, a respective item feature, a respective target purchase, and a respective label.

13. The method of claim 11, wherein the item recommendation data comprise second records each comprising a respective anchor item, a respective candidate item, a respective item feature, and a respective label.

14. The method of claim 10, wherein the plurality of candidate recommendation models comprise a linear regression recommendation model, a neural network recommendation model, and a matrix factorization recommendation model.

15. The method of claim 14, wherein training the plurality of candidate recommendation models and the adversarial exposure model further comprises:
performing the two-timescale gradient ascent descent to optimize the minimax objective for each of the plurality of candidate recommendation models.

16. The method of claim 10, wherein selecting the best optimized machine learning model comprises:
performing an evaluation of the plurality of candidate recommendation models, as trained, using the adversarial exposure model, as trained; and
selecting the best optimized machine learning model based on the evaluation.

17. The method of claim 10, wherein generating the recommendations comprises:
constructing a recall set of candidate recommendation pairs;
generating a ranking of candidate recommendation pairs in the recall set using the best optimized machine learning model; and
determining the recommendations based on the ranking.

18. The method of claim 10, further comprising:
when a user requests to view an anchor item, sending one or more of the recommendations to be displayed to the user.

19. A non-transitory computer-readable medium storing computing instructions that, when executed on a processor, causes the processor to perform operations comprising:
generating first-stage click data by mimicking a generating mechanism of a real-world dataset;
obtaining training data based on the first-stage click data and based on controlling an exposure mechanism;
generating optimized machine learning models and a most adversarial exposure model by training a plurality of candidate recommendation models and an adversarial exposure model using the training data after obtaining the training data based on the first-stage click data and based on controlling the exposure mechanism,
- wherein the plurality of candidate recommendation models comprises multiple different families of machine learning models,
- wherein training the adversarial exposure model comprises using sequential optimization, with two-timescale gradient ascent descent schema to optimize a minimax objective for the adversarial exposure model, by taking turns with model updating, and
- wherein training the adversarial exposure model terminates when a validation metric changes less than a predetermined threshold after a predetermined number of consecutive epochs;

selecting, from the optimized machine learning models, a best optimized machine learning model by using the most adversarial exposure model to evaluate the optimized machine learning models on evaluation data; and generating, based on receiving a request from a front-end component, recommendations by using the best optimized machine learning model.

20. The non-transitory computer-readable medium of claim 19, wherein the training data comprise personalized recommendation data.

* * * * *